(12) United States Patent
Shao

(10) Patent No.: US 12,529,467 B2
(45) Date of Patent: Jan. 20, 2026

(54) ILLUMINATION DEVICE

(71) Applicant: Japan Display Inc., Tokyo (JP)

(72) Inventor: Gang Shao, Tokyo (JP)

(73) Assignee: Japan Display Inc., Tokyo (JP)

( * ) Notice: Subject to any disclaimer, the term of this patent is extended or adjusted under 35 U.S.C. 154(b) by 31 days.

(21) Appl. No.: 18/791,779

(22) Filed: Aug. 1, 2024

(65) Prior Publication Data
US 2024/0392952 A1    Nov. 28, 2024

Related U.S. Application Data

(63) Continuation of application No. PCT/JP2023/000684, filed on Jan. 12, 2023.

(30) Foreign Application Priority Data

Feb. 8, 2022    (JP) ................................ 2022-018019

(51) Int. Cl.
*F21V 14/00*    (2018.01)
*G02F 1/29*    (2006.01)

(52) U.S. Cl.
CPC .............. *F21V 14/003* (2013.01); *G02F 1/29* (2013.01); *G02F 2203/07* (2013.01)

(58) Field of Classification Search
CPC .......... F21V 14/003; F21V 23/00; G02F 1/13; G02F 1/29; G02F 2203/07; H05B 47/105
See application file for complete search history.

(56) References Cited

FOREIGN PATENT DOCUMENTS

| CN | 106954325 A | * | 7/2017 | ........... H05B 47/105 |
|---|---|---|---|---|
| JP | H02-065001 A | | 3/1990 | |
| JP | 2019175686 A | * | 10/2019 | |
| JP | 2021-018412 A | | 2/2021 | |

OTHER PUBLICATIONS

Search report issued in related International Patent Application No. PCT/JP2023/000684 mailed on Mar. 20, 2023, and English translation of same. 5 pages.
Written Opinion issued in related International Patent Application No. PCT/JP2023/000684 mailed on Mar. 20, 2023. 4 pages.
Office Action issued in related Japanese Patent Application No. 2023-580119 on Nov. 19, 2024 and English translation of same. 6 pages.

* cited by examiner

*Primary Examiner* — Raymond R Chai
(74) *Attorney, Agent, or Firm* — K&L Gates LLP

(57) ABSTRACT

An illumination device includes a light source, a position data acquirer configured to acquire position data indicating positions of a plurality of detection targets, a position data processor configured to calculate ellipse data corresponding to the positions of the detection targets based on the position data, a light quantity setter configured to set light quantity of the light source based on the ellipse data calculated by the position data processor, an irradiation shape setter configured to set an irradiation shape of light from the light source based on the ellipse data calculated by the position data processor, and an irradiation angle setter configured to set an irradiation angle of light from the light source based on the ellipse data calculated by the position data processor.

10 Claims, 29 Drawing Sheets

FIG.23
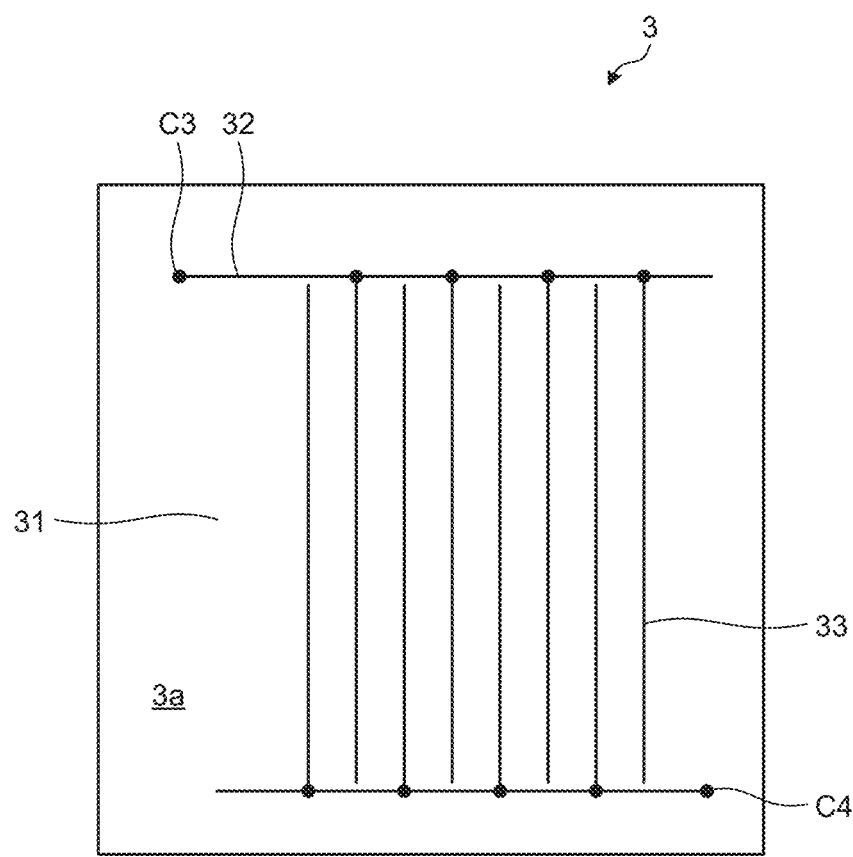
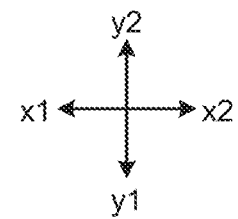

ILLUMINATION DEVICE

CROSS-REFERENCE TO RELATED APPLICATION

This application is a continuation of International Patent Application No. PCT/JP2023/000684 filed on Jan. 12, 2023 which designates the United States, incorporated herein by reference, and which claims the benefit of priority from Japanese Patent Application No. 2022-018019 filed on Feb. 8, 2022, incorporated herein by reference.

BACKGROUND

1. Technical Field

The present disclosure relates to an illumination device.

2. Description of the Related Art

An illumination device is provided on, for example, the ceiling of a room such as a conference room. A plurality of illumination devices are provided in a room in some cases depending on the size of the room.

Japanese Patent Application Laid-open Publication No. H02-065001 discloses an illumination instrument in which a light source such as a light emitting diode (LED) is combined with a thin lens fabricated with a prism pattern and that changes a light distribution angle by changing the distance between the light source and the thin lens.

All of a plurality of illumination devices are turned on in some cases even when there are a small number of people in a room. Turning on all illumination devices is not preferable from the perspective of achieving energy saving. It may be possible to separately turn on or off a plurality of illumination devices. In this case, energy saving can be achieved by turning on illumination devices in necessary areas and turning off illumination devices in other areas.

However, in such case, a plurality of illumination devices need to be manually operated, which is cumbersome. When a person is near the boundary between illumination zones of illumination devices, the illumination devices corresponding to both illumination zones need to be turned on. A manual operation is needed also when a participant leaves a meeting halfway through or the number of participants increases during a meeting, which is cumbersome as well.

The present disclosure is made in view of the above-described problem and intended to provide an illumination device with which operation is not cumbersome, energy is not wasted, and energy saving is achieved.

SUMMARY

An illumination device according to an embodiment of the present disclosure includes a light source, a position data acquirer configured to acquire position data indicating positions of a plurality of detection targets, a position data processor configured to calculate ellipse data corresponding to the positions of the detection targets based on the position data, a light quantity setter configured to set light quantity of the light source based on the ellipse data calculated by the position data processor, an irradiation shape setter configured to set an irradiation shape of light from the light source based on the ellipse data calculated by the position data processor, and an irradiation angle setter configured to set an irradiation angle of light from the light source based on the ellipse data calculated by the position data processor.

BRIEF DESCRIPTION OF THE DRAWINGS

FIG. 23 is a plan view illustrating wiring of a counter substrate of the light distribution panel according to the embodiment when viewed from above;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1:
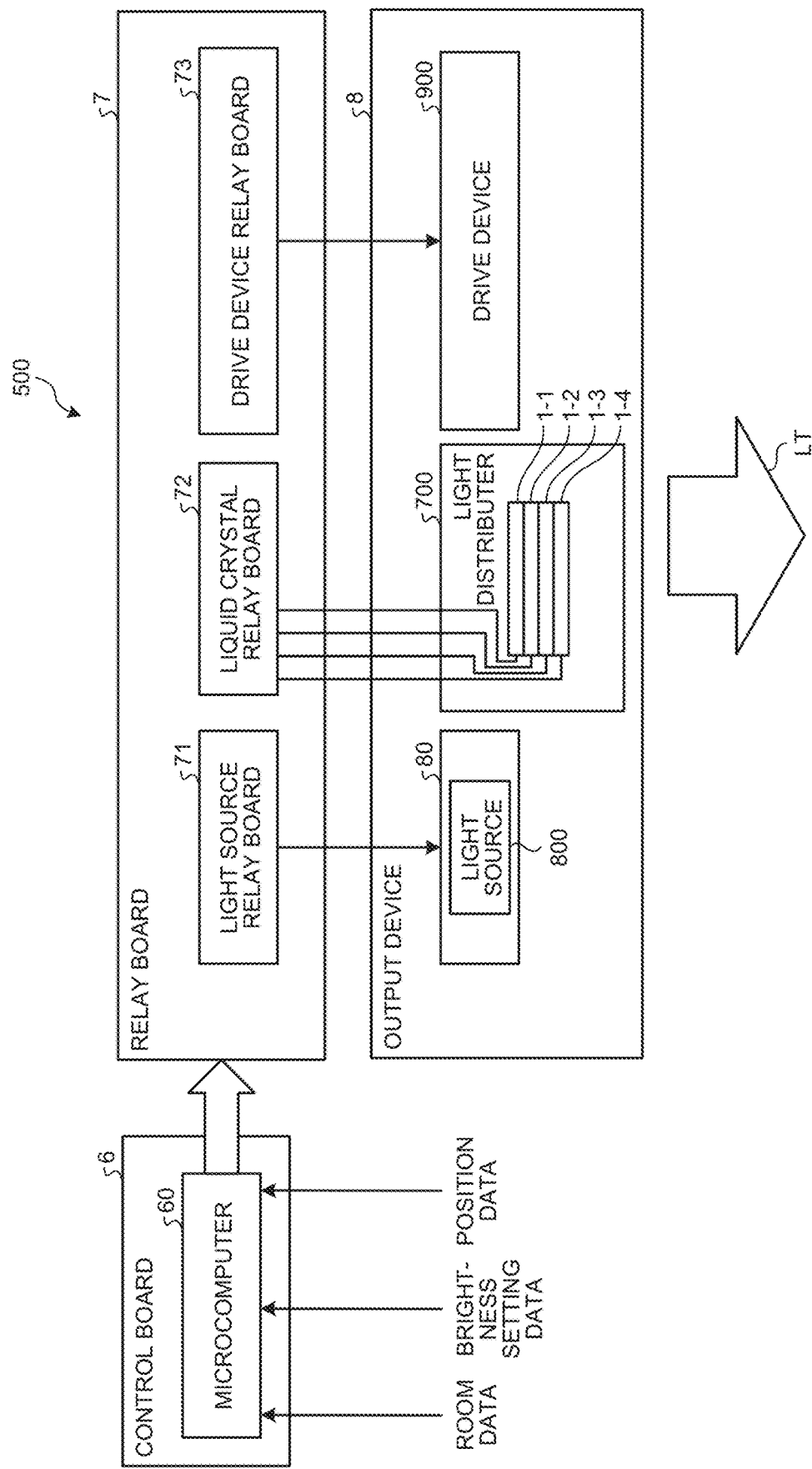
FIG. 1 is a block diagram illustrating a functional configuration of an illumination device according to an embodiment of the present disclosure.
Figure 2:
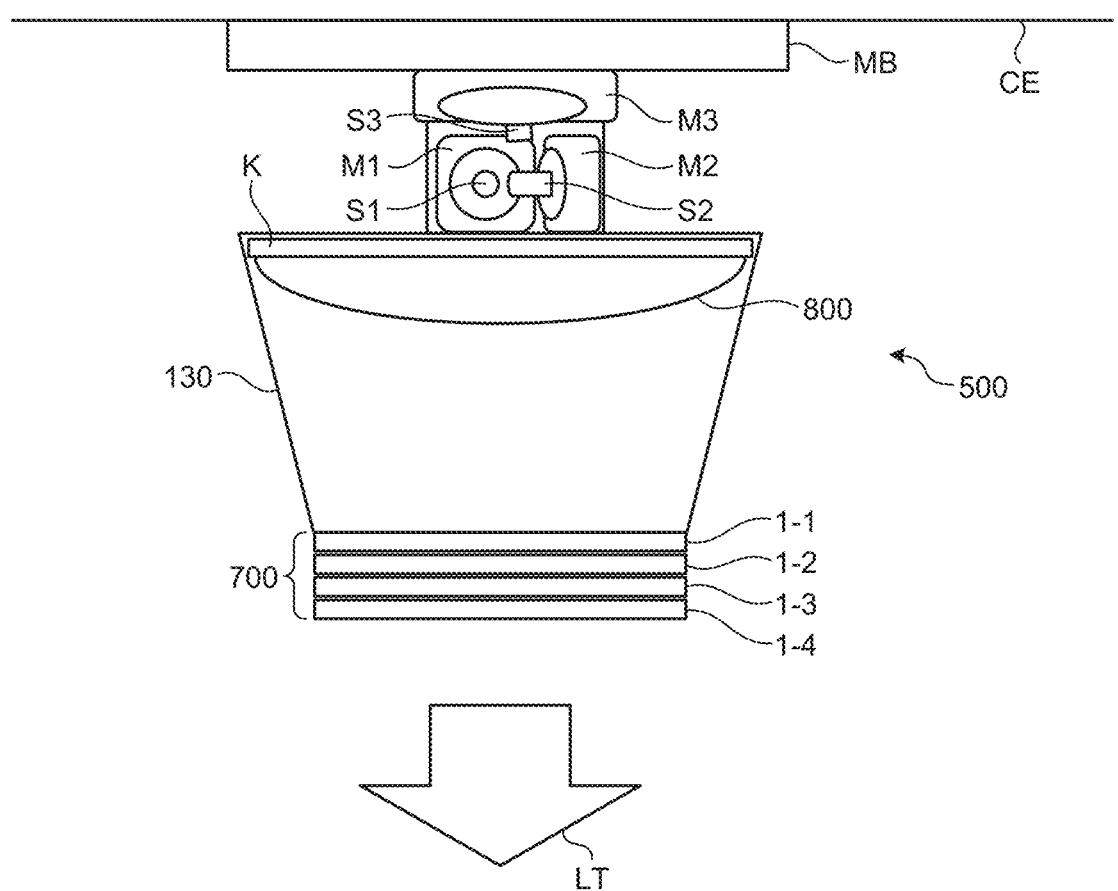
FIG. 2 is a diagram schematically illustrating the structure of the illumination device according to the embodiment of the present disclosure.

FIG. 1 is a block diagram illustrating a functional configuration of an illumination device according to an embodiment of the present disclosure. FIG. 2 is a diagram schematically illustrating the structure of the illumination device according to the embodiment of the present disclosure.

In FIG. 1, an illumination device 500 of the present example includes a control board 6, a relay board 7, and an output device 8. The control board 6 includes a microcomputer 60. As described later, the microcomputer 60 receives input of position data, brightness data, and room data and outputs light quantity data, applied voltage data, and rotation angle data.

The relay board 7 includes a light source relay board 71, a liquid crystal relay board 72, and a drive device relay board 73. The relay board 7 relays data output from the control board 6 and outputs the data to the output device 8.

The output device 8 includes a light adjuster 80, a light distributor 700, and a drive device 900. The output device 8 outputs light LT. The light adjuster 80 includes a light source 800. The light distributor 700 changes the irradiation shape of light from the light source 800 based on an input signal. The light distributor 700 includes four light distribution panels 1-1 to 1-4. The light distribution panels 1-1 to 1-4 deform light from the light source 800 into an ellipse. The drive device 900 adjusts the irradiation angle of the light LT. As described later, the drive device 900 is controlled to irradiate the light LT toward the position of the center of the ellipse. The drive device 900 includes a motor for adjusting the irradiation angle of the light LT. In the present example, three motors are included as described later.

In FIG. 2, the illumination device 500 includes an installation base MB, motors M1 to M3, a board K, the light source 800, a reflection plate 130, and the light distributor 700.

The installation base MB is fixed to a ceiling CE of a room. The illumination device 500 may suspend from the ceiling. In this case, the installation base MB is unnecessary.

The motor M3 is fixed to the installation base MB. The motors M1, M2, and M3 include rotational shafts S1, S2, and S3. The rotational shafts S1, S2, and S3 are orthogonal to one another. For example, stepping motors may be used as the motors M1, M2, and M3.

The motor M1 is a motor for adjusting the angle of the illumination device 500 relative to the surface of the ceiling CE and moving the central position of light irradiation in an X-axis direction. The motor M2 is a motor for adjusting the angle of the illumination device 500 relative to the surface of the ceiling CE and moving the central position of light irradiation in a Y-axis direction. The motor M3 is a motor for adjusting the rotation angle of the illumination device 500 relative to the surface of the ceiling CE. The center of light relative to an irradiation target can be moved in the X-axis and Y-axis directions through rotation of the motors M1 and M2. Simultaneously, the rotation angle of the illumination device 500 can be changed through rotation of the motor M3.

The board K in the present example includes the control board 6 and the relay board 7 described above. The board K is electrically coupled to each component in the illumination device 500 through a non-illustrated cable. The cable is preferably, for example, a flexible cable.

The light source 800 is, for example, an LED. A light-emitting element other than an LED may be used as the light source 800 as long as light quantity can be controlled.

The reflection plate 130 has a curved surface that reflects light output from the light source 800. The light reflected by the reflection plate 130 is incident on the light distributor 700. The light distributor 700 emits the light from a surface opposite a surface on which the light is incident. The emitted light is incident on, for example, a table or a floor surface.

The light distributor 700 includes four light distribution panels 1-1 to 1-4. The four light distribution panels 1-1 to 1-4 have the same configuration. The four light distribution panels 1-1 to 1-4 can change the shape and size of incident light. The light distribution panels 1-1 to 1-4 deform the light from the light source 800 into an elliptical shape, for example.

In the present example, the light distribution panel 1-1 and the light distribution panel 1-2 are stacked. The light distribution panel 1-1 is a light distribution panel for p-wave polarization. The light distribution panel 1-2 is a light distribution panel for s-wave polarization. Flexible light modulation control is possible by providing signals based on light to be emitted to the light distribution panel 1-1 and the light distribution panel 1-2. Note that the light distribution panel 1-1 may be a light distribution panel for s-wave polarization and the light distribution panel 1-2 may be a light distribution panel for p-wave polarization. It is only required that any one of the light distribution panel 1-1 and the light distribution panel 1-2 is a light distribution panel for p-wave polarization and the other is a light distribution panel for s-wave polarization.

In the present example, the light distribution panel 1-3 and the light distribution panel 1-4 are stacked. The light distribution panel 1-3 is a light distribution panel for p-wave polarization. The light distribution panel 1-4 is a light distribution panel for s-wave polarization. Flexible light modulation control is possible by providing signals based on light to be emitted to the light distribution panel 1-3 and the light distribution panel 1-4. Note that the light distribution panel 1-3 may be a light distribution panel for s-wave polarization and the light distribution panel 1-4 may be a light distribution panel for p-wave polarization. It is only required that any one of the light distribution panel 1-3 and the light distribution panel 1-4 is a light distribution panel for p-wave polarization and the other is a light distribution panel for s-wave polarization.

Accordingly, the four light distribution panels 1-1 to 1-4 have a configuration including two liquid crystal cells for p-wave polarization and two liquid crystal cells for s-wave polarization. With this configuration, the size and shape of emitted light can be changed and more flexible light distribution control is possible.

Microcomputer

Figure 3:
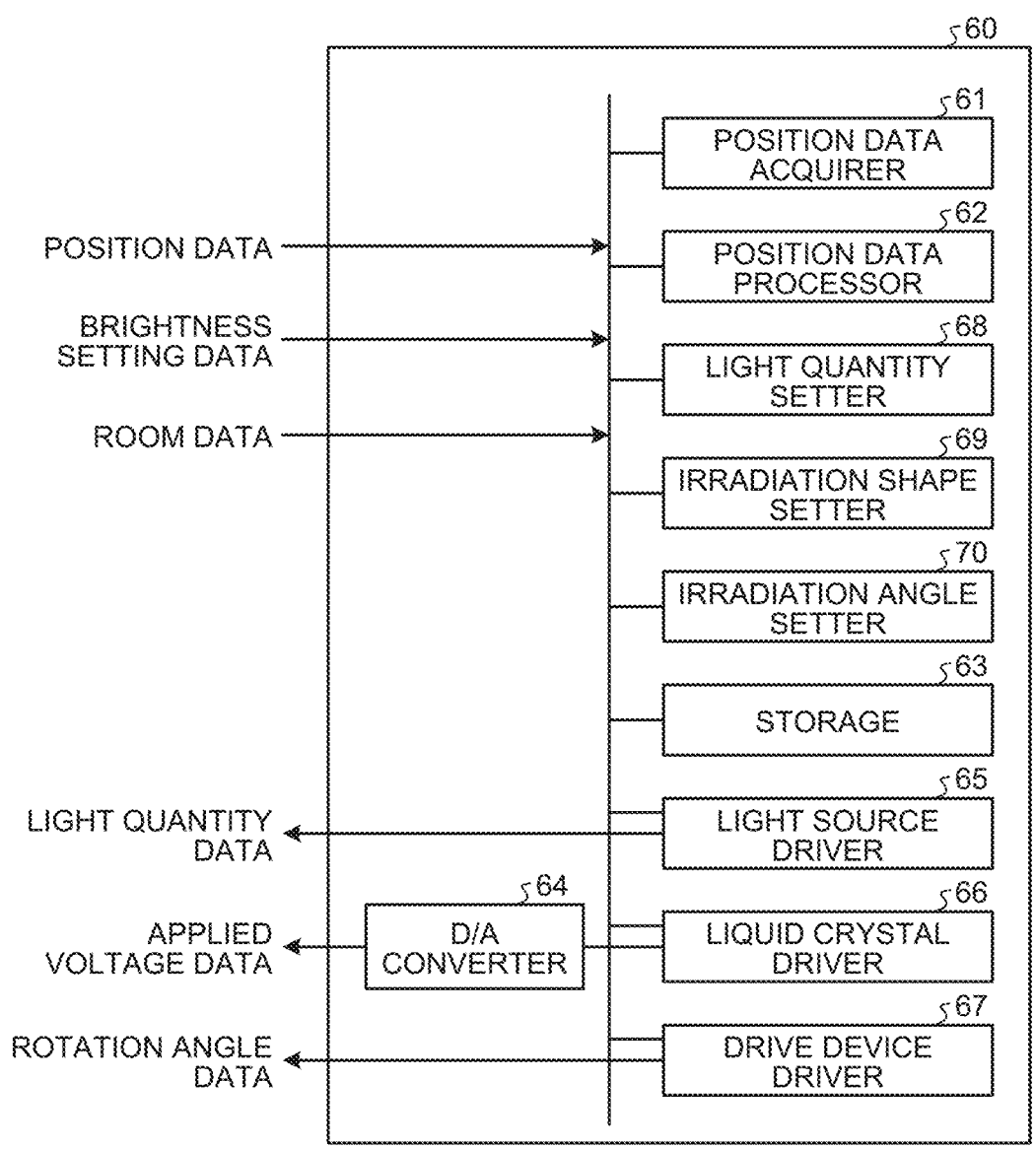
FIG. 3 is a block diagram illustrating a functional configuration of a microcomputer.

FIG. 3 is a block diagram illustrating a functional configuration of the microcomputer 60. As illustrated in FIG. 3, the microcomputer 60 includes a position data acquirer 61, a position data processor 62, a storage 63, a digital/analog (D/A) converter 64, a light source driver 65, a liquid crystal driver 66, a drive device driver 67, a light quantity setter 68, an irradiation shape setter 69, and an irradiation angle setter 70.

The microcomputer 60 receives input of position data, brightness setting data, and room data. The position data is data indicating the positions of a plurality of persons as detection targets. The position data is obtained by, for example, collectively capturing an image of the persons with an infrared camera and processing the image obtained by the image capturing. The infrared camera is provided on, for example, the ceiling of the room or a wall near the ceiling.

The room data is data related to the room in which the illumination device 500 is installed. The room data is data indicating the size of the room in which the illumination device 500 is installed. The room data is data indicating, for example, the length and width of the floor of the room and the height of the ceiling from the floor. The room data is set, for example, when the illumination device 500 is installed. The room data may be stored in the storage 63, and the room data read from the storage 63 may be used.

The position data acquirer 61 acquires the position data indicating the positions of a plurality of persons around a table provided in the room. For example, the position data acquirer 61 receives the position data detected by a non-illustrated position sensor through wired communication or wireless communication. The position data acquired by the position data acquirer 61 is input to the position data processor 62.

The position data processor 62 calculates ellipse data corresponding to a minimum enclosing ellipse based on the position data acquired by the position data acquirer 61. The position data processor calculates the ellipse data corresponding to the minimum enclosing ellipse surrounding the positions of the persons. The position data processor calculates the ellipse data corresponding to the minimum enclosing ellipse by, for example, obtaining an approximate ellipse corresponding to the positions of the persons and expanding the approximate ellipse. The position data processor 62 calculates the ellipse data by, for example, approximating the positions of the persons with an ellipse by a least-square method. Thereafter, the ellipse data corresponding to the minimum enclosing ellipse is calculated by expanding the ellipse according to the ellipse data.

The storage 63 stores various kinds of data. The D/A converter 64 receives input of digital data. The D/A converter 64 outputs an analog signal corresponding to the digital data.

The light quantity setter 68 sets the light quantity of the light source 800 based on the ellipse data calculated by the position data processor 62. At setting of the light quantity, the light quantity setter 68 sets the light quantity based on the area of the ellipse corresponding to the ellipse data, a set brightness, and data related to the room in which the illumination device is installed. The light quantity setter 68 generates light quantity data corresponding to the set light quantity. Specifically, at setting of the light quantity, the light quantity setter 68 generates the light quantity data based on the ellipse data (the area of the ellipse) as well as the set brightness and the data related to the room in which the illumination device is installed and sets the light quantity. Hereinafter, the same applies when "based on the ellipse data" is used with respect to setting of the light quantity.

The irradiation shape setter 69 sets the irradiation shape of light from the light source 800 based on the ellipse data calculated by the position data processor 62. At setting of the irradiation shape of light, the irradiation shape setter 69 sets the irradiation shape of light based on the semi-major axis and semi-minor axis of the ellipse corresponding to the ellipse data, and the data related to the room in which the illumination device is installed. The irradiation shape setter 69 generates applied voltage data corresponding to the set irradiation shape of light. Specifically, at setting of the irradiation shape of light, the irradiation shape setter 69 generates the applied voltage data based on the ellipse data (semi-major axis and semi-minor axis) as well as the data related to the room in which the illumination device is installed and sets the irradiation shape of light. Hereinafter, the same applies when "based on the ellipse data" is used with respect to setting of the irradiation shape of light.

The irradiation angle setter 70 sets the irradiation angle of light from the light source 800 based on the ellipse data calculated by the position data processor 62. At setting of the irradiation angle of light, the irradiation angle setter 70 sets the irradiation angle of light based on the coordinates of the center of the ellipse corresponding to the ellipse data, the tilt of the ellipse, and the data related to the room in which the illumination device is installed. The irradiation angle setter 70 generates rotation angle data corresponding to the set irradiation angle of light. Specifically, at setting of the irradiation angle of light, the irradiation angle setter 70 generates the rotation angle data based on the ellipse data (the coordinates of the center of the ellipse and the tilt of the ellipse) as well as the data related to the room in which the illumination device is installed and sets the irradiation angle of light. Hereinafter, the same applies when "based on the ellipse data" is used with respect to setting of the irradiation angle of light.

The light source driver 65 outputs the light quantity data for driving the light source 800 in the light adjuster 80 based on the light quantity data generated by the light quantity setter 68.

The liquid crystal driver 66 outputs the applied voltage data applied to the light distribution panels 1-1 to 1-4 in the light distributor 700 based on the applied voltage data generated by the irradiation shape setter 69.

The drive device driver 67 outputs the rotation angle data for driving each motor of the drive device 900 based on the rotation angle data generated by the irradiation angle setter 70.

The illumination device 500 described above with reference to FIGS. 1 to 3 outputs light based on the light quantity set by the light quantity setter 68, the irradiation shape set by the irradiation shape setter 69, and the irradiation angle set by the irradiation angle setter 70. The light output from the illumination device 500 is emitted to the persons in the room. With the illumination device 500, operation is not cumbersome, energy is not wasted, and energy saving is achieved.

Irradiation Area of Light from Illumination Device

Figure 4:
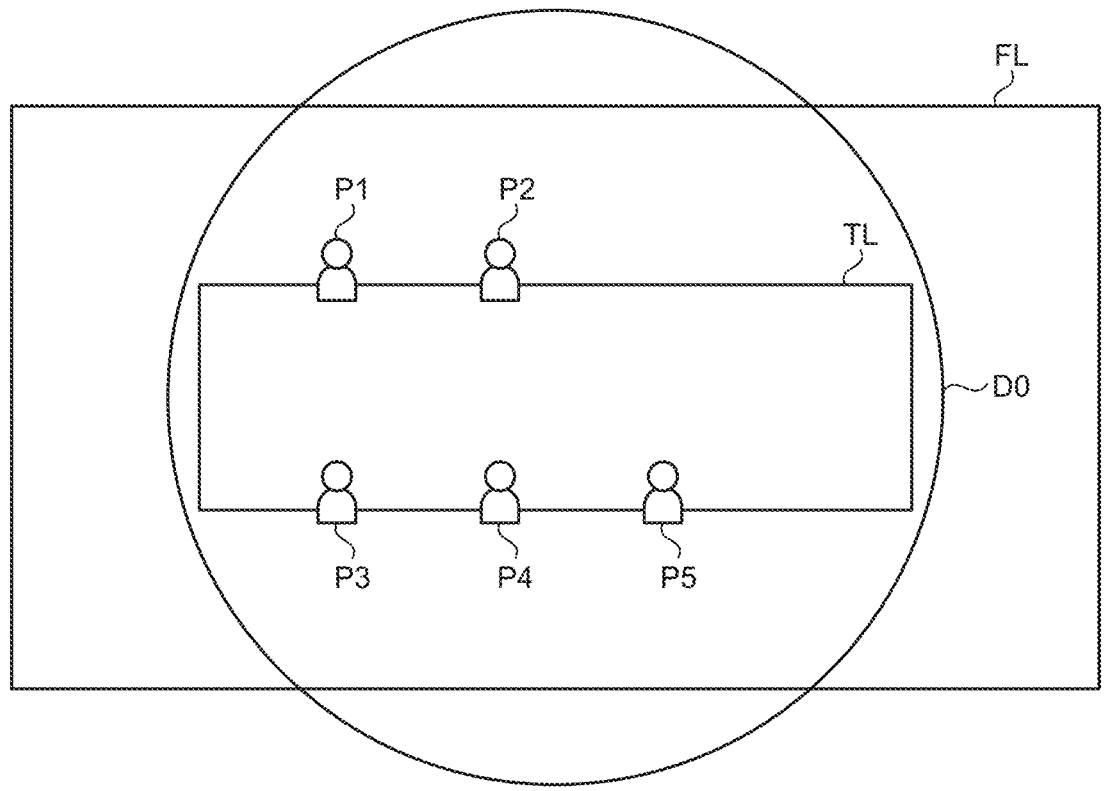
FIG. 4 is a diagram illustrating an example of an irradiation area of light from an illumination device of a comparative example.

FIG. 4 is a diagram illustrating an example of an irradiation area of light from an illumination device of a comparative example. FIGS. 5 to 14 are diagrams illustrating examples of irradiation areas of light from the illumination device of the present disclosure. In FIGS. 4 to 14, it is assumed that a horizontally long table having a shape that is not a square when viewed from the ceiling side is installed in the room. If circular light is emitted in such a case, areas where no person is present may be irradiated with light, resulting in wasted irradiated areas. In other words, areas where persons are present as well as areas where no persons are present are irradiated with light, and accordingly, electric power is wasted and energy saving cannot be achieved.

FIG. 4 illustrates a state in which a floor FL is viewed from the ceiling side of a room such as a meeting room. In FIG. 4, a table TL is provided on the floor FL in the room. In the present example, non-illustrated chairs are provided around the table TL, and persons P1, P2, P3, P4, and P5 are seated in the chairs. Specifically, FIG. 4 illustrates a state in which a plurality of persons are present around the table TL.

Consider a case where light of a precise circle or an ellipse D0 close to a precise circle is emitted to the floor FL as illustrated in FIG. 4. In this case, the light is incident on a part where the persons P1 to P5 are present and a part where the table TL is installed as well as a part where no person is present on the floor FL, and part of the light is incident on a wall surface other than the floor FL. Accordingly, the light is incident on parts that do not need to be irradiated, and energy is wasted.

Figure 5:
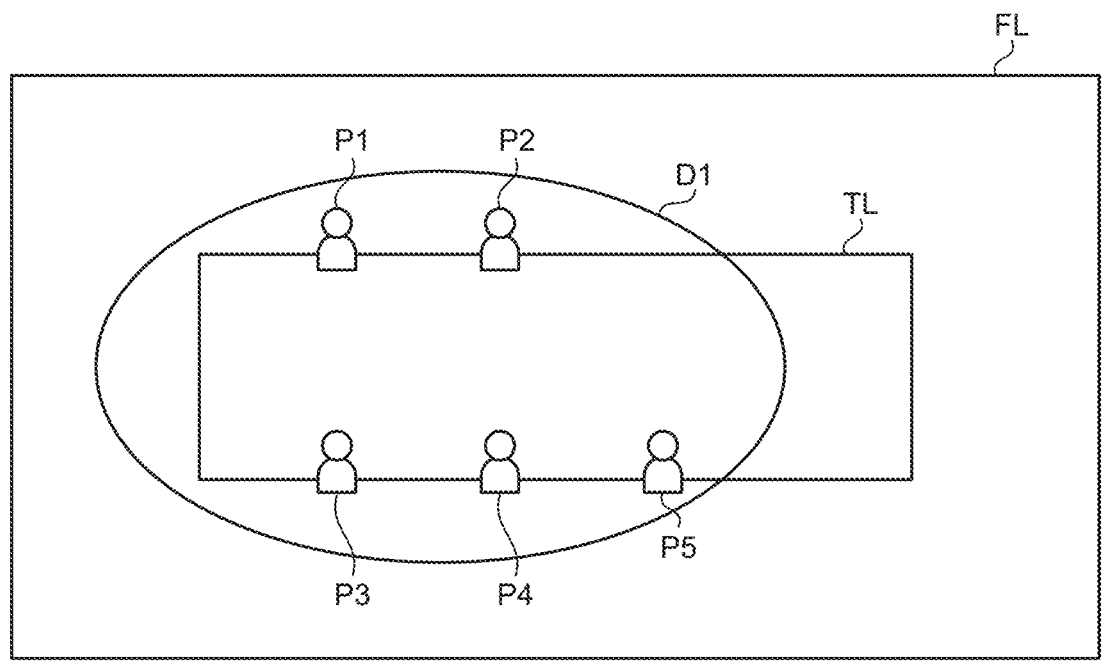
FIG. 5 is a diagram illustrating an example of an irradiation area of light from an illumination device of the present disclosure.

FIG. 5 illustrates a state in which the persons P1, P2, P3, P4, and P5 are seated around the table TL as in the case of FIG. 4. In other words, FIG. 5 illustrates a state in which a plurality of persons are present around the table TL. FIG. 5 illustrates a state in which light is incident on a part where persons are present but not on parts that do not need light. In FIG. 5, light of an ellipse D1 having an area smaller than that of the ellipse D0 illustrated in FIG. 4 is irradiated. The ellipse D1 has a shape that is horizontally longer than the ellipse D0. Accordingly, for example, the irradiation area of light in the case of FIG. 5 is 50% of the irradiation area of light in the case of FIG. 4. Thus, energy can be effectively utilized without waste when the irradiation area is minimized as needed as illustrated in FIG. 5. Note that it is assumed that electric power consumption is proportional to the irradiation area of light. This is the same in the following.

Figure 6:
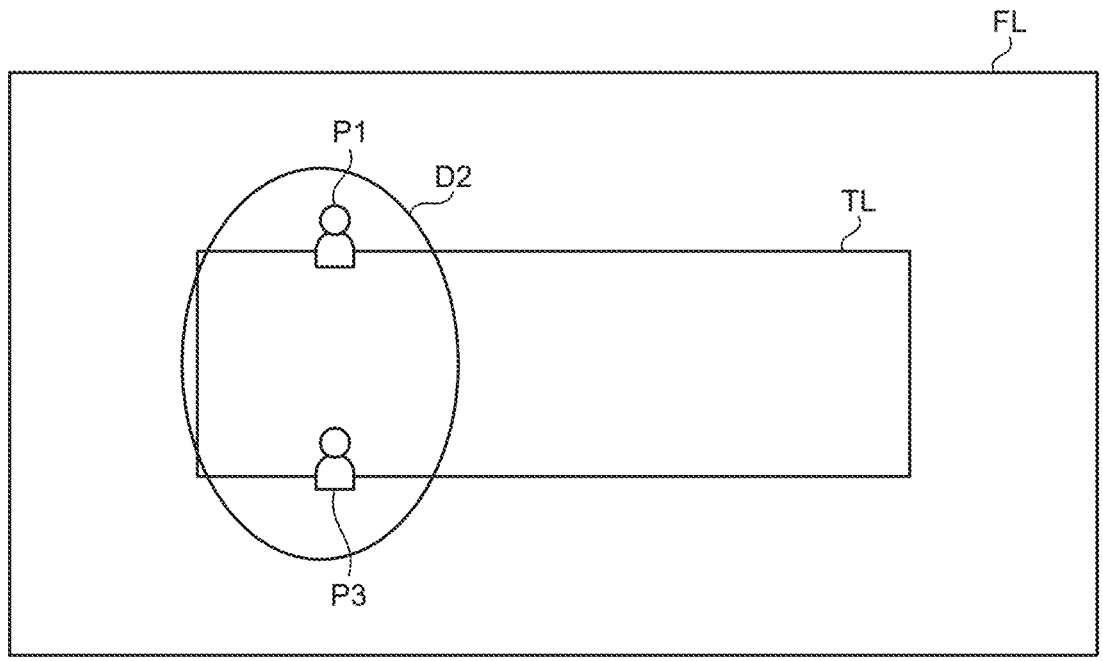
FIG. 6 is a diagram illustrating an example of an irradiation area of light from the illumination device of the present disclosure.

FIG. 6 illustrates a state in which two persons P1 and P3 are seated at an end part of the table TL. In the case of FIG. 6, the two persons P1 and P3 are seated facing each other. FIG. 6 illustrates a state in which light is incident on a part where persons are present but not on parts that do not need light. In FIG. 6, light of an ellipse D2 having an area smaller than that of the ellipse D1 illustrated in FIG. 5 is irradiated. The ellipse D2 has a vertically long shape unlike the ellipse D1. Accordingly, for example, the irradiation area of light in the case of FIG. 6 is 20% of the irradiation area of light in the case of FIG. 4. Thus, energy can be effectively utilized without waste when the irradiation area is minimized as needed as illustrated in FIG. 6.

Figure 7:
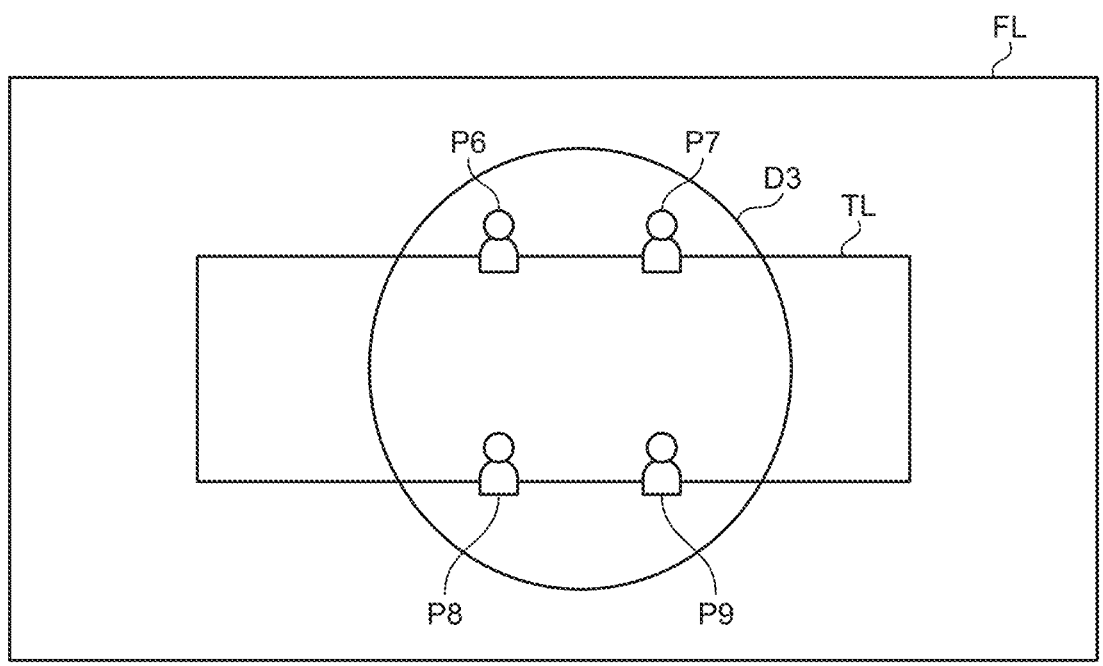
FIG. 7 is a diagram illustrating an example of an irradiation area of light from the illumination device of the present disclosure.

FIG. 7 illustrates a state in which four persons P6, P7, P8, and P9 are seated near the center of the table TL. In the case of FIG. 7, light of a precise circle or an ellipse D3 close to a precise circle is irradiated. FIG. 7 illustrates a state in which light is incident on a part where persons are present but not on parts that do not need light. In FIG. 7, light of the ellipse D3 having an area smaller than the ellipse D0 illustrated in FIG. 4 is irradiated. Accordingly, for example, the irradiation area of light in the case of FIG. 7 is 30% of the irradiation area of light in the case of FIG. 4. Thus, energy can be effectively utilized without waste when the irradiation area is minimized as needed as illustrated in FIG. 7.

Figure 8:
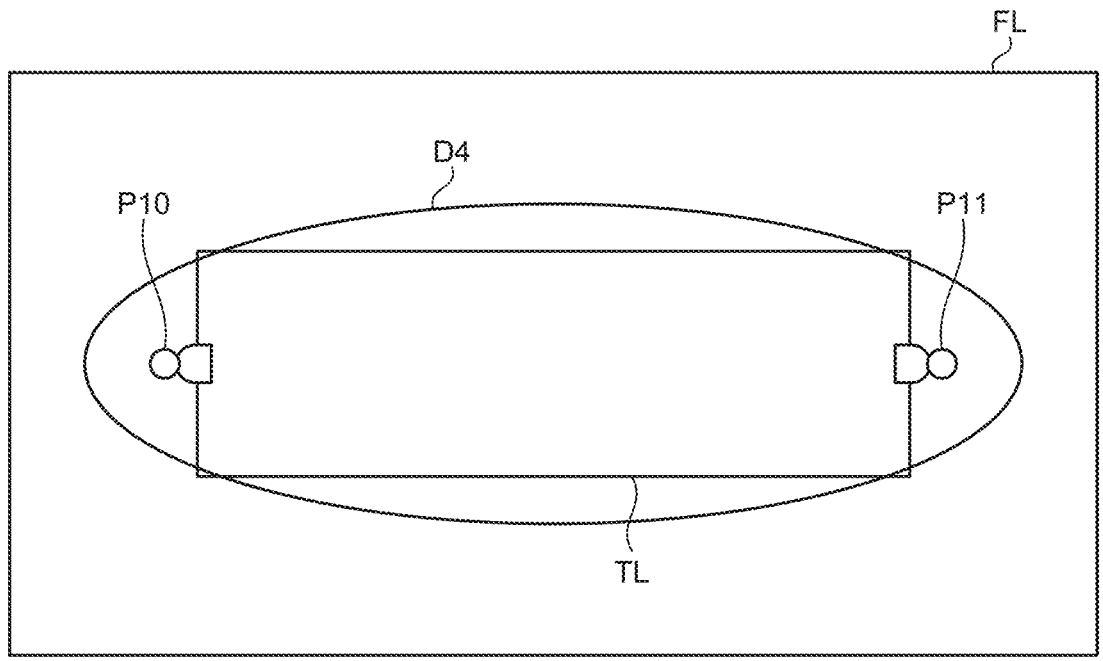
FIG. 8 is a diagram illustrating an example of an irradiation area of light from the illumination device of the present disclosure.

FIG. 8 illustrates a state in which a person P10 is seated at one end of the table TL and a person P11 is seated at the other end. In the case of FIG. 8, light of a horizontally long ellipse D4 is irradiated. FIG. 8 illustrates a state in which light is incident on a part where persons are present but not on parts that do not need light. In FIG. 8, light of the ellipse D4 having an area smaller than that of the ellipse D0 illustrated in FIG. 4 is irradiated. Accordingly, for example, the irradiation area of light in the case of FIG. 8 is 50% of the irradiation area of light in the case of FIG. 4. Thus, energy can be effectively utilized without waste when the irradiation area is minimized as needed as illustrated in FIG. 8.

Figure 9:
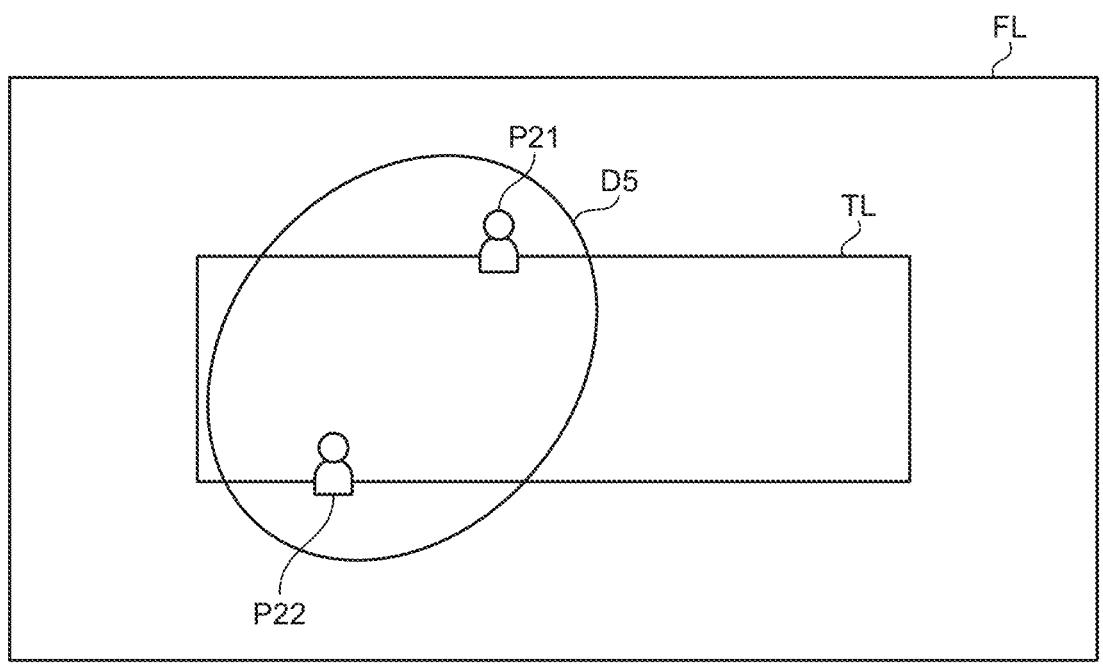
FIG. 9 is a diagram illustrating an example of an irradiation area of light from the illumination device of the present disclosure.

FIG. 9 illustrates a state in which persons P21 and P22 are seated around the table TL, obliquely facing each other. In the case of FIG. 9, light of an obliquely tilted ellipse D5 is irradiated. FIG. 9 illustrates a state in which light is incident on a part where persons are present but not on parts that do not need light. In FIG. 9, light of the ellipse D5 having an area smaller than that of the ellipse D0 illustrated in FIG. 4 is irradiated. Accordingly, for example, the irradiation area of light in the case of FIG. 9 is 30% of the irradiation area of light in the case of FIG. 4. Thus, energy can be effectively utilized without waste when the irradiation area is minimized as needed as illustrated in FIG. 9.

Figure 10:
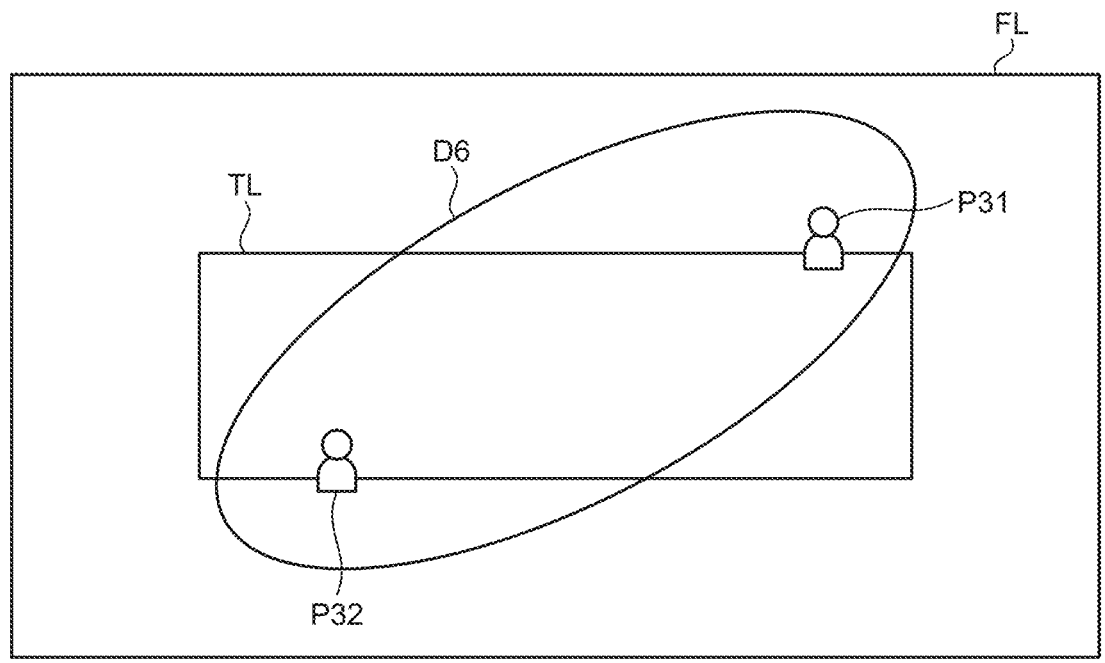
FIG. 10 is a diagram illustrating an example of an irradiation area of light from the illumination device of the present disclosure.

FIG. 10 illustrates a state in which persons P31 and P32 are seated around the table TL, obliquely facing each other. In the case of FIG. 10, persons P31 and P32 are seated obliquely facing each other across a longer distance than in the case of FIG. 9. In the case of FIG. 10, light of an obliquely tilted ellipse D6 is irradiated. FIG. 10 illustrates a state in which light is incident on a part where persons are present but not on parts that do not need light. In FIG. 10, light of the ellipse D6 having an area smaller than that of the ellipse D0 illustrated in FIG. 4 is irradiated. Accordingly, for example, the irradiation area of light in the case of FIG. 10 is 40% of the irradiation area of light in the case of FIG. 4. Thus, energy can be effectively utilized without waste when the irradiation area is minimized as needed as illustrated in FIG. 10.

Figure 11:
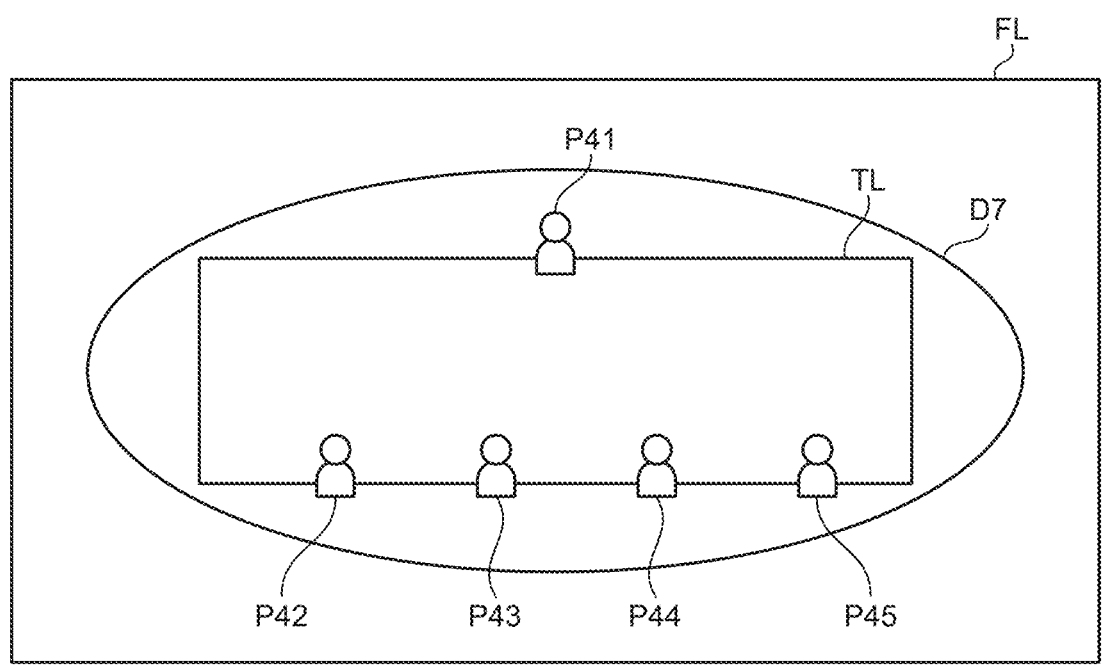
FIG. 11 is a diagram illustrating an example of an irradiation area of light from the illumination device of the present disclosure.

FIG. 11 illustrates a state in which a person P41 is seated near the center of one long side of the table TL and persons P42, P43, P44, and P45 are seated at the other long side. In the case of FIG. 11, light of a horizontally long ellipse D7 is emitted to the entire table TL. FIG. 11 illustrates a state in which light is incident on a part where persons are present but not on parts that do not need light. In FIG. 11, light of the ellipse D7 having an area smaller than that of the ellipse D0 illustrated in FIG. 4 is irradiated. Accordingly, for example, the irradiation area of light in the case of FIG. 11 is 60% of the irradiation area of light in the case of FIG. 4. Thus, energy can be effectively utilized without waste when the irradiation area is minimized as needed as illustrated in FIG. 11.

Figure 12:
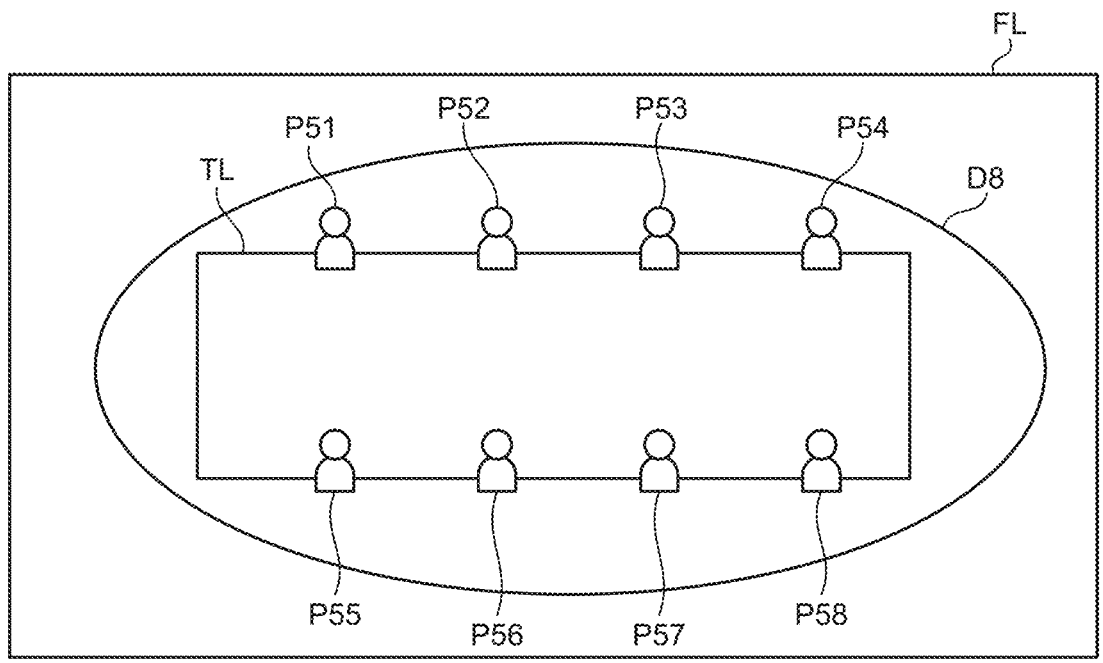
FIG. 12 is a diagram illustrating an example of an irradiation area of light from the illumination device of the present disclosure.

FIG. 12 illustrates a state in which persons P51, P52, P53, and P54 are seated at one long side of the table TL and persons P55, P56, P57, and P58 are seated at the other long side. In the case of FIG. 12, light of a horizontally long ellipse D8 is emitted to the entire table TL. FIG. 12 illustrates a state in which light is incident on a part where persons are present but not on parts that do not need light. In FIG. 12, light of the ellipse D8 having an area smaller than that of the ellipse D0 illustrated in FIG. 4 is irradiated. Accordingly, for example, the irradiation area of light in the case of FIG. 12 is 70% of the irradiation area of light in the case of FIG. 4. Thus, energy can be effectively utilized without waste when the irradiation area is minimized as needed as illustrated in FIG. 12.

Figure 13:
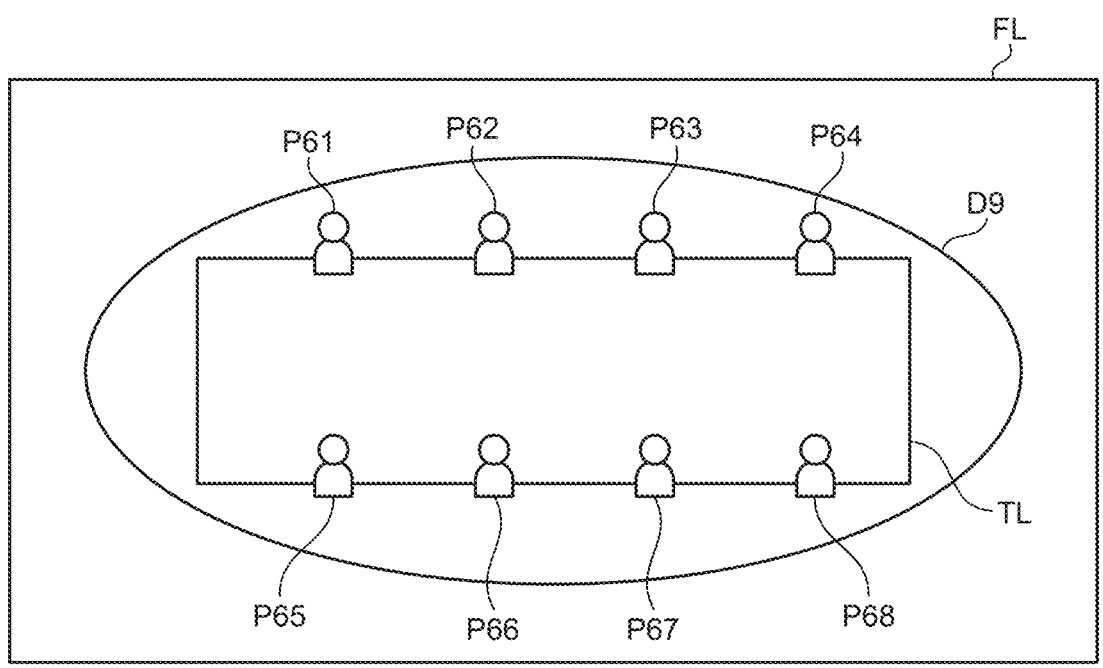
FIG. 13 is a diagram illustrating an example of an irradiation area of light from the illumination device of the present disclosure.
Figure 14:
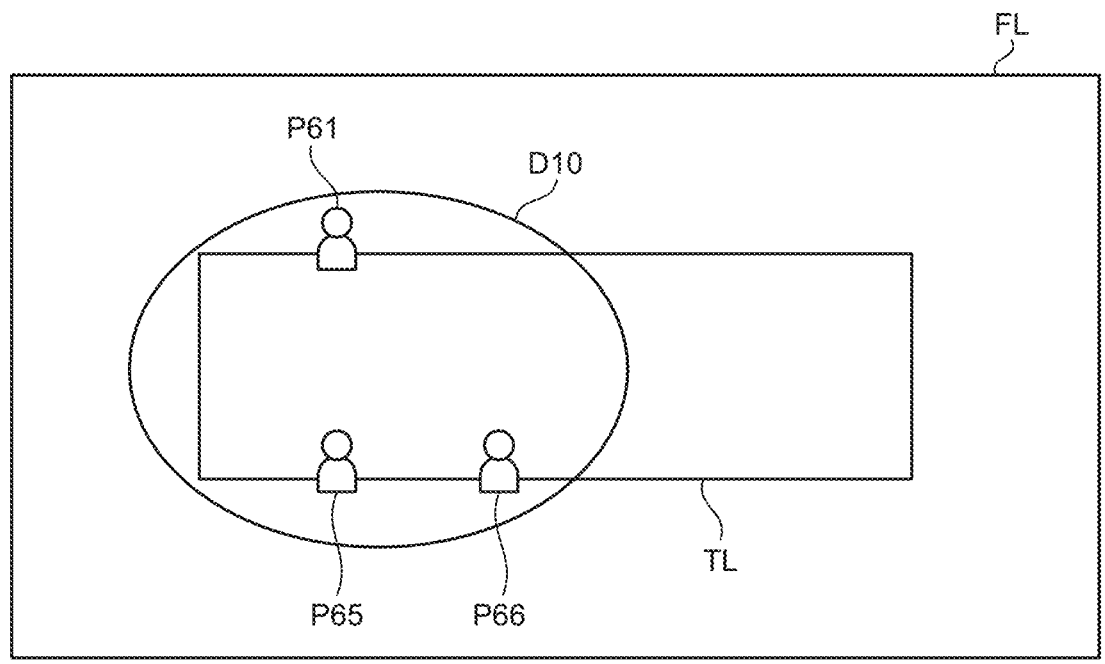
FIG. 14 is a diagram illustrating an example of an irradiation area of light from the illumination device of the present disclosure.

FIGS. 13 and 14 are diagrams for describing a case of leave during a meeting. FIG. 13 illustrates a state before the leave during a meeting, and FIG. 14 illustrates a state after the leave during a meeting. FIG. 13 illustrates a state in which persons P61, P62, P63, and P64 are seated at one long side of the table TL and persons P65, P66, P67, and P68 are seated at the other long side. In the case of FIG. 13, light of a horizontally long ellipse D9 is emitted to the entire table TL. In the case of FIG. 13, light of the ellipse D9 having an area smaller than that of the ellipse D0 illustrated in FIG. 4 is emitted as in the case of FIG. 12. Accordingly, for example, the irradiation area of light in the case of FIG. 13 is 70% of the irradiation area of light in the case of FIG. 4.

Following the state in FIG. 13, FIG. 14 illustrates a state in which the persons P62, P63, and P64 at one long side of the table TL left their seats and the persons P67 and P68 at the other long side left their seats. Thus, in the case of FIG. 14, light of an ellipse D10 smaller than that of the ellipse D9 in FIG. 13 is emitted to the persons P61, P65, and P66 currently seated. In the case of FIG. 14, light of the ellipse D10 having an area smaller than that of the ellipse D0 illustrated in FIG. 4 is irradiated. Accordingly, for example, the irradiation area of light in the case of FIG. 14 is 30% of the irradiation area of light in the case of FIG. 4. Energy can be effectively utilized without waste when the irradiation area is minimized as needed as described above.

Note that the state in FIG. 14 returns to the state in FIG. 13 when the persons who have left their seats return to the original seats. Thus, in the case of FIG. 13, light of the ellipse D9 having an area smaller than that of the ellipse D0 illustrated in FIG. 4 is irradiated. Accordingly, for example, the irradiation area of light in the case of FIG. 13 is 70% of the irradiation area of light in the case of FIG. 4. Thus, energy can be effectively utilized without waste when the irradiation area is minimized as needed as illustrated in FIG. 13.

Processing by Position Data Processor

Figure 15:
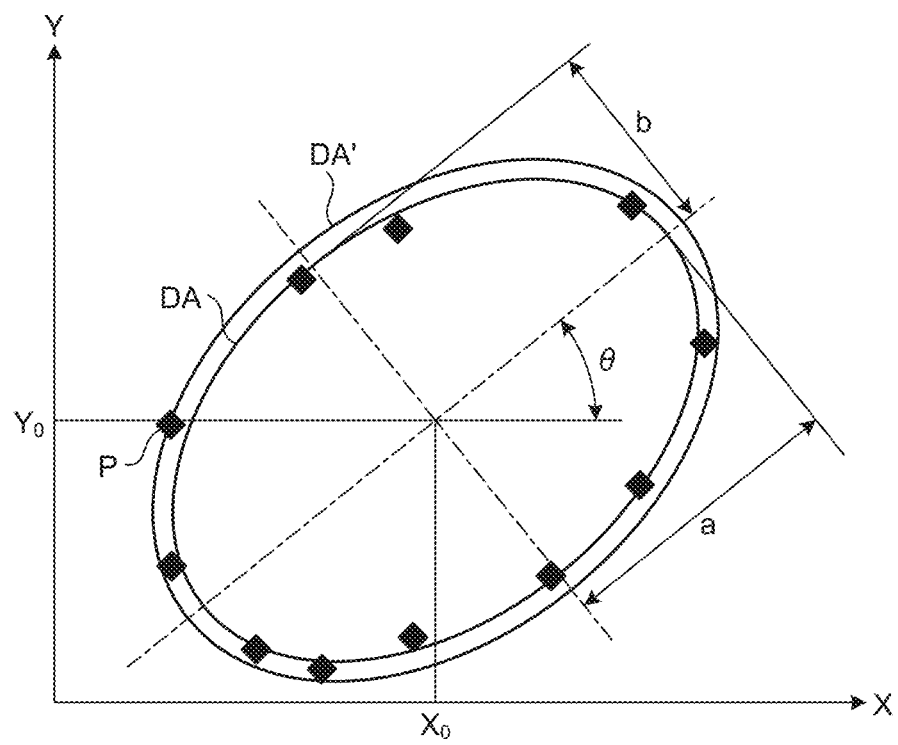
FIG. 15 is a diagram for describing example processing by a position data processor.

The contents of processing by the position data processor 62 for calculating the ellipse data corresponding to the minimum enclosing ellipse will be described below with reference to FIG. 15. FIG. 15 is a diagram for describing an example of the processing by the position data processor 62. The position data processor 62 acquires data of an ellipse DA by performing ellipse approximation and then calculates data of a minimum enclosing ellipse DA' by expanding the ellipse DA.

Each rhombus in FIG. 15 represents the position of a person which is acquired by the position data acquirer 61. The positions of the rhombi can be approximated to the ellipse DA by, for example, a least-square method. The coordinates of the central position of the ellipse DA are ($X_0$, $Y_0$). In addition, the semi-major axis of the ellipse DA is a length a, the semi-minor axis of the ellipse DA is a length b, and the angle between the major axis of the ellipse DA and the X axis, in other words, the tilt angle of the ellipse DA is an angle θ. Accordingly, the ellipse DA can be expressed by Expression (1).

$$\left(\frac{(X_i - X_0)\cos\theta + (Y_i - Y_0)\sin\theta}{a}\right)^2 + \left(\frac{-(X_i - X_0)\sin\theta + (Y_i - Y_0)\cos\theta}{b}\right)^2 = 1 \quad (1)$$

When Expression (1) is expanded and the left-hand side is rewritten for Xi and Yi, Expression (2) is obtained.

$$\left(\frac{\cos^2\theta}{a^2} + \frac{\sin^2\theta}{b^2}\right)X_i^2 + 2\left(\frac{1}{a^2} - \frac{1}{b^2}\right)\sin\theta\cos\theta X_i Y_i + \left(\frac{\sin^2\theta}{a^2} + \frac{\cos^2\theta}{b^2}\right)Y_i^2 - \\ 2\left(\frac{X_0\cos^2\theta + Y_0\sin\theta\cos\theta}{a^2} + \frac{X_0\sin^2\theta - Y_0\sin\theta\cos\theta}{b^2}\right)X_i - \\ 2\left(\frac{X_0\sin\theta\cos\theta + Y_0\sin^2\theta}{a^2} + \frac{Y_0\cos^2\theta - X_0\sin\theta\cos\theta}{b^2}\right)Y_i + \\ \frac{X_0^2\cos^2\theta + 2X_0 Y_0\sin\theta\cos\theta + Y_0^2\sin^2\theta}{a^2} + \\ \frac{X_0^2\sin^2\theta - 2X_0 Y_0\sin\theta\cos\theta + Y_0^2\cos^2\theta}{b^2} \quad (2)$$

When "1" on the right hand side of Expression (1) is moved to the left-hand side and unknown parts are replaced with variables $A_0$, $B_0$, $C_0$, $D_0$, $E_0$, and $F_0$, Expression (3) is obtained.

$$A_0 X_i^2 + B_0 X_i Y_i + C_0 Y_i^2 + D_0 X_i + E_0 Y_i + F_0 = 0 \quad (3)$$

When Expression (3) is divided by any one of the variables $A_0$, $B_0$, $C_0$, $D_0$, $E_0$, and $F_0$ to reduce one variable, Expression (4) is obtained.

$$X_i^2 + AX_iY_i + BY_i^2 + CX_i + DY_i + E = 0 \quad (4)$$

The values of the variables A, B, C, D, and E are determined to minimize the sum of squares of Expression (4). When Expression (5) is differentiated with respect to A, B, C, D, and E and expressed in a matrix, Expression (6) is obtained.

$$\sum(X_i^2 + AX_iY_i + BY_i^2 + CX_i + DY_i + E)^2 = 0 \quad (5)$$

$$\begin{pmatrix} \sum X_i^2 Y_i^2 & \sum X_i Y_i^3 & \sum X_i^2 Y_i & \sum X_i Y_i^2 & \sum X_i Y_i \\ \sum X_i Y_i^3 & \sum Y_i^4 & \sum X_i Y_i^2 & \sum Y_i^3 & \sum Y_i^2 \\ \sum X_i^2 Y_i & \sum X_i Y_i^2 & \sum X_i^2 & \sum X_i Y_i & \sum X_i \\ \sum X_i Y_i^2 & \sum Y_i^3 & \sum X_i Y_i & \sum Y_i^2 & \sum Y_i \\ \sum X_i Y_i & \sum Y_i^2 & \sum X_i & \sum Y_i & \sum 1 \end{pmatrix} \begin{pmatrix} A \\ B \\ C \\ D \\ E \end{pmatrix} = \begin{pmatrix} -\sum X_i^3 Y_i \\ -\sum X_i^2 Y_i^2 \\ -\sum X_i^3 \\ -\sum X_i^2 Y_i \\ -\sum X_i^2 \end{pmatrix} \quad (6)$$

When Expression (6) is multiplied by the inverse matrix to calculate A, B, C, D, and E, Expression (7) is obtained.

$$\begin{pmatrix} A \\ B \\ C \\ D \\ E \end{pmatrix} = \begin{pmatrix} \sum X_i^2 Y_i^2 & \sum X_i Y_i^3 & \sum X_i^2 Y_i & \sum X_i Y_i^2 & \sum X_i Y_i \\ \sum X_i Y_i^3 & \sum Y_i^4 & \sum X_i Y_i^2 & \sum Y_i^3 & \sum Y_i^2 \\ \sum X_i^2 Y_i & \sum X_i Y_i^2 & \sum X_i^2 & \sum X_i Y_i & \sum X_i \\ \sum X_i Y_i^2 & \sum Y_i^3 & \sum X_i Y_i & \sum Y_i^2 & \sum Y_i \\ \sum X_i Y_i & \sum Y_i^2 & \sum X_i & \sum Y_i & \sum 1 \end{pmatrix}^{-1} \begin{pmatrix} -\sum X_i^3 Y_i \\ -\sum X_i^2 Y_i^2 \\ -\sum X_i^3 \\ -\sum X_i^2 Y_i \\ -\sum X_i^2 \end{pmatrix} \quad (7)$$

When A, B, C, D, and E are calculated from Expression (7), the coordinates $(X_0, Y_0)$ of the center of the ellipse DA to be calculated is expressed by Expressions (8a) and (8b). The angle $\theta$ is expressed by Expression (9). The length a of the semi-major axis of the ellipse is expressed by Expression (10a), and the length b of the semi-minor axis of the ellipse is expressed by Expression (10b).

$$X_0 = \frac{AD - 2BC}{4B - A^2} \quad (8a)$$

$$Y_0 = \frac{AC - 2D}{4B - A^2} \quad (8b)$$

$$\theta = \frac{\tan^{-1}\left(\frac{A}{1-B}\right)}{2} \quad (9)$$

Note that Expressions (1) to (10b) described above can be found on a Web page (https://imagingsolution.blog.fc2.com/blog-entry-20.html). As described above, data of the ellipse DA is acquired by performing ellipse approximation and then data of the minimum enclosing ellipse DA' is calculated expanding the ellipse DA. Specifically, data of the ellipse DA is obtained by performing ellipse approximation based on the positions of the rhombi in FIG. 15. Subsequently, the minimum enclosing ellipse DA' is obtained by expanding the ellipse DA. In this case, the ellipse DA is expanded so that the ellipses before and after the expansion are similar to each other in shape. For example, the ellipse DA is expanded so that a rhombus P positioned farthest from the center of the ellipse passes through the perimeter of the minimum enclosing ellipse DA'. An ellipse slightly larger than the minimum enclosing ellipse DA' may be set for sufficient brightness. For example, an ellipse in which the rhombus P in FIG. 15 is completely included may be set. For example, regarding the ellipse DA passing through the rhombus P, the semi-major axis a may be increased by 5% and the semi-minor axis b may be increased by 5%. In this manner, sufficient light quantity can be set for each person by obtaining data of a slightly larger ellipse.

Example of Installation of Illumination Device

Figure 16:
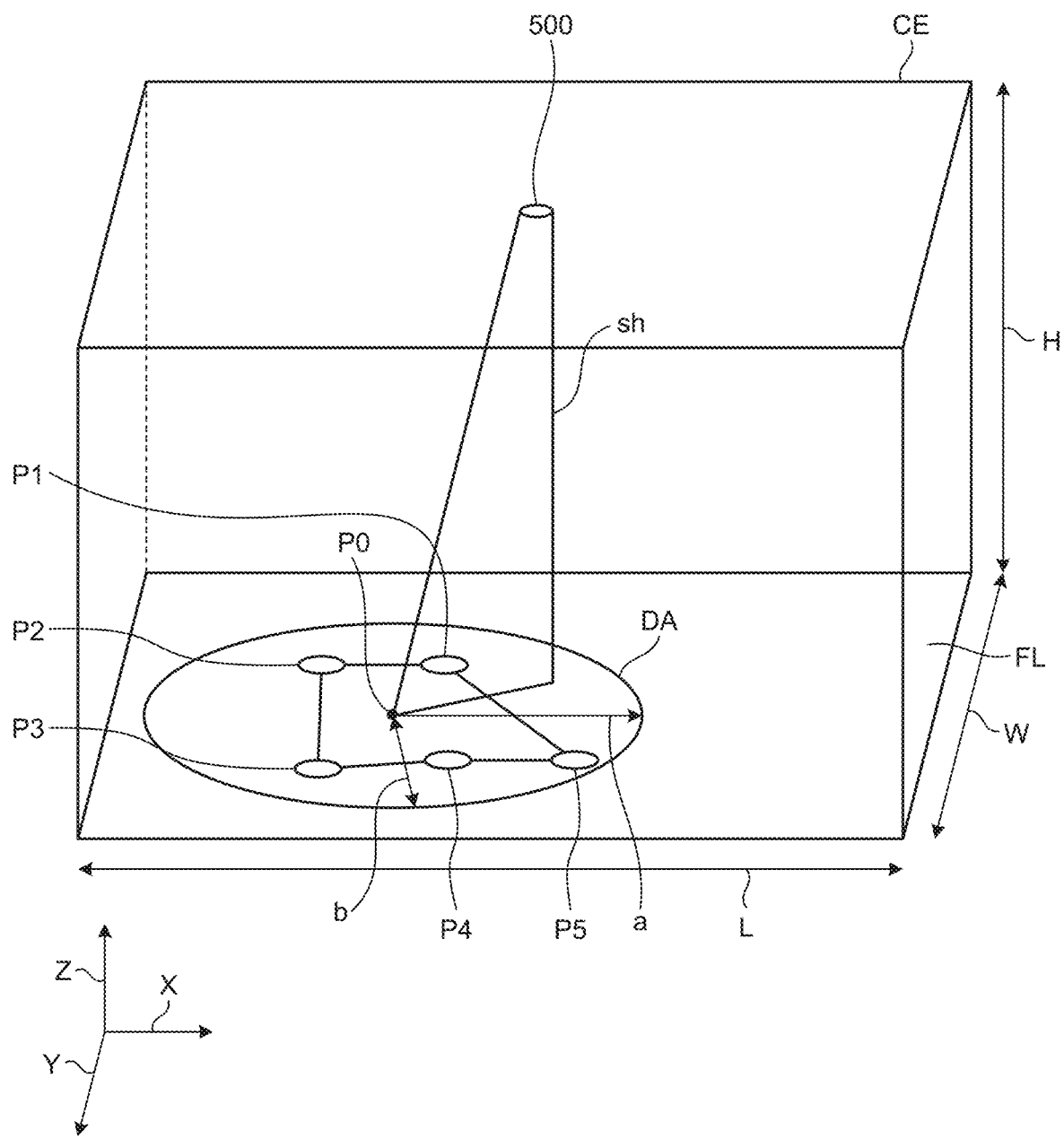
FIG. 16 is a diagram illustrating an example of installation of the illumination device.

FIG. 16 is a diagram illustrating an example of installation of the illumination device. FIG. 16 illustrates the room in which the illumination device 500 is installed. In FIG. 16, the room in which the illumination device 500 is installed has a length L, a width W, and a height H. In FIG. 16, a direction along the length L is referred to as an X-axis direction, a direction along the width W is referred to as a Y-axis direction, and a direction along the height H is referred to as a Z-axis direction.

As illustrated in FIG. 16, the illumination device 500 is provided on the ceiling CE of the room. Five persons P1 to P5 are present below the illumination device 500. The ellipse DA is a minimum enclosing ellipse enclosing the persons P1 to P5. The above-described position data processor 62 calculates ellipse data corresponding to the ellipse DA based on position data of the persons P1 to P5. A center P0 in FIG. 16 is the center of the ellipse DA. A perpendicular line sh in FIG. 16 is a perpendicular line down from the illumination device 500 toward the floor FL. The illumination device 500 controls the motors M1 and M2 of the drive device 900 so that light is emitted to the position of the center P0 of the ellipse DA.

Note that light may be irradiated onto an area slightly larger than the area of the minimum enclosing ellipse. It is preferable to make adjustments on site in the room where the illumination device 500 is installed as to how wide the area should be. Irradiation of a slightly larger area is achieved by slightly increasing the degree of light diffusion by the light distribution panels 1-1 to 1-4. For example, the area of an ellipse with the semi-major axis a and semi-minor axis b increased by 5% approximately may be irradiated.

Light Quantity of Light Source

Light quantity Lm of the light source 800 is proportional to area s of the ellipse DA, the height H of the room, and requested brightness BL. In other words, the light quantity Lm is a function of the area s, the height H, and the brightness BL and can be expressed as $Lm=f_{Lm}(S, H, BL)$. The area s of the ellipse DA can be calculated by multiplying the product of the semi-major axis a and semi-minor axis b of the ellipse DA by the ratio $\pi$ of the circumference of a circle. The light quantity Lm can be set based on the area s of the ellipse DA, the height H, and the brightness BL. The light quantity Lm of the light quantity data is set to be larger as the area of the ellipse DA is larger. The light quantity Lm of the light quantity data is set to be larger as the height H of the room is larger. The light quantity Lm of the light quantity data is set to be larger as the requested brightness is larger.

Voltage Applied to Light Distribution Panels

The diffusion degree of light from the light source 800 can be set by voltage applied to the light distribution panels 1-1 to 1-4. A diffusion degree d of the light distribution panels 1-1 to 1-4 is a function of applied voltage v and can be expressed as $d=f_d(v)$. The inverse function of the diffusion degree $d=f_d(v)$ is $v=f_d^{-1}(d)$. For the ellipse DA with the semi-major axis a and the semi-minor axis b, the applied voltage corresponding to the X-axis direction is $v_x=f_d^{-1}(a)$, and the applied voltage corresponding to the Y-axis direction is $v_y=f_d^{-1}(b)$. With the height H of the room, $v_x$ and $v_y$ can be expressed as $f_d^{-1}(a, H)$ and $f_d^{-1}(b, H)$, respectively. Voltage applied to the light distribution panels 1-1 to 1-4 can be calculated based on the semi-major axis a and semi-minor axis b of the ellipse DA and the height H.

Rotation Angle of Each Motor of Drive Device

Figure 17:
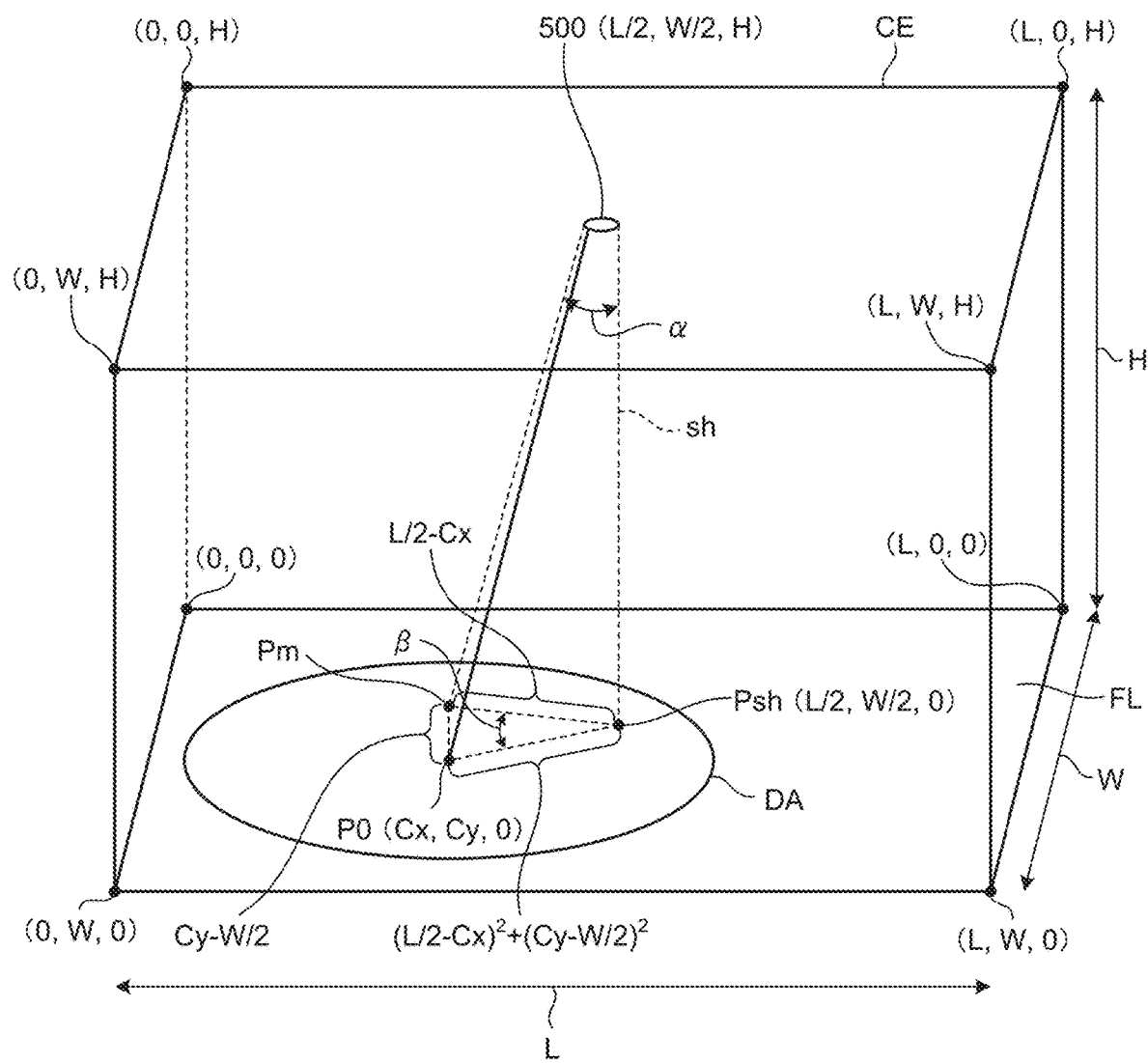
FIG. 17 is a diagram for describing the rotation angles of motors of a drive device.

FIG. 17 is a diagram for describing the rotation angles of the motors M1 and M2 of the drive device 900. In FIG. 17, the coordinates of the four corners of the floor FL are (0, 0, 0), (L, 0, 0), (0, W, 0), and (L, W, 0). The coordinates of the four corners of the ceiling CE are (0, 0, H), (L, 0, H), (0, W, H), and (L, W, H). The coordinates of the central position of the illumination device 500 are (L/2, W/2, H). The coordinates of a foot Psh of the perpendicular line sh are (L/2, W/2, 0). The coordinates of the center P0 of the ellipse DA are (Cx, Cy, 0).

The rotation angle of the motor M1 is referred to as an angle α, and the rotation angle of the motor M2 is referred to as an angle β. The central position of light irradiation after movement by rotation of the motor M1 is referred to as a point Pm. When a right triangle having a hypotenuse along a line segment connecting the center P0 and the foot Psh of the perpendicular line sh is considered, the distance between the center P0 and the point Pm is L/2−Cx, and the distance between the point Pm and the foot Psh of the perpendicular line sh is Cy−W/2. Accordingly, the distance between the center P0 and the foot Psh of the perpendicular line sh is $(L/2-Cx)^2+(Cy-W/2)^2$.

Figure 18:
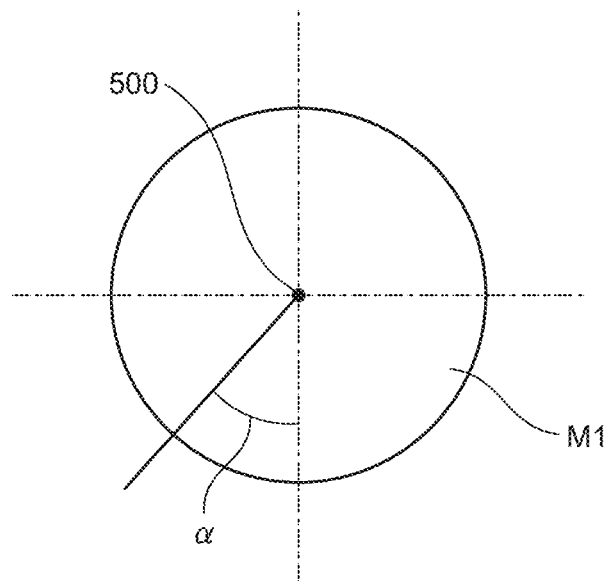
FIG. 18 is a diagram for describing the rotation angle of a motor of the drive device.

FIG. 18 is a diagram for describing the rotation angle of the motor M1 of the drive device 900. As described above, the central position of light irradiation is moved in the X-axis direction by rotation of the motor M1. In FIG. 18, the rotation angle of the motor M1 about the illumination device 500 is the angle α.

In a case of Cx<L/2 and Cy>W/2 with the center P0 (Cx, Cy, 0) and the center (L/2, W/2, H) of the illumination device 500, tan(α) is (L/2−Cx)/H, and accordingly, the angle α is $\tan^{-1}((L/2-Cx)/H)$.

Figure 19:
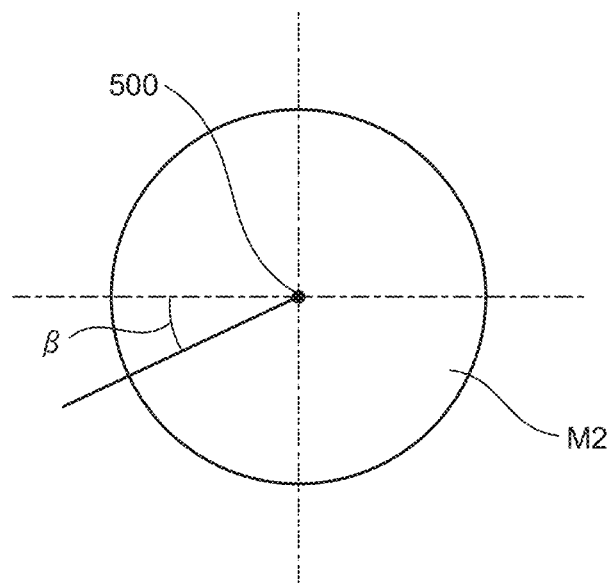
FIG. 19 is a diagram for describing the rotation angle of a motor of the drive device.

FIG. 19 is a diagram for describing the rotation angle of the motor M2 of the drive device 900. As described above, the central position of light irradiation is moved in the Y-axis direction by rotation of the motor M2. In FIG. 19, the rotation angle of the motor M2 about the illumination device 500 is the angle β.

In a case of Cx<L/2 and Cy>W/2 with the center P0 (Cx, Cy, 0) and the center (L/2, W/2, H) of the illumination device 500, tan (B) is (Cy−W/2)/(L/2−Cx), and accordingly, the angle β is $\tan^{-1}((Cy-W/2)/(L/2-Cx))$.

Figure 20:
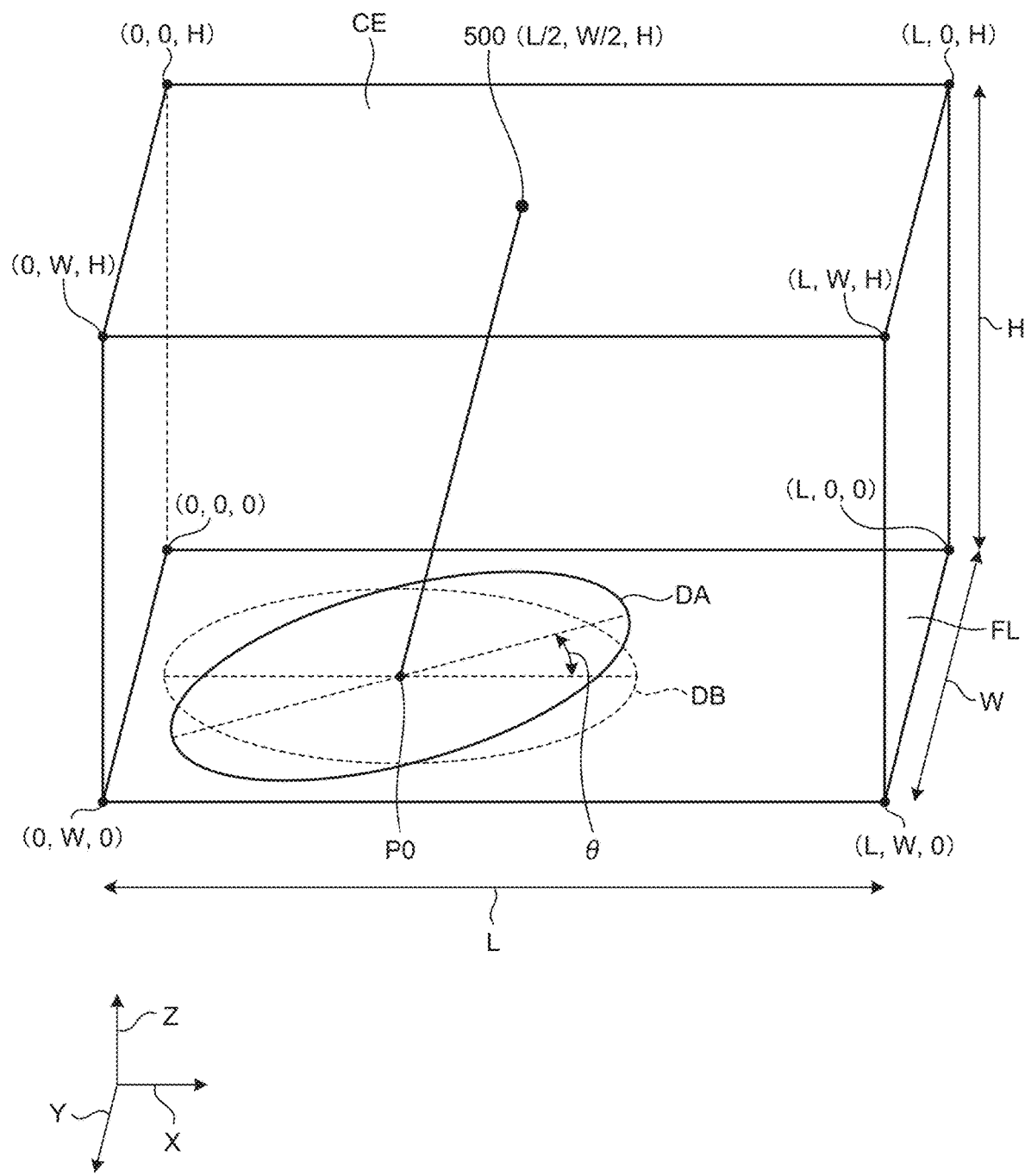
FIG. 20 is a diagram for describing the rotation angle of a motor of the drive device.

FIG. 20 is a diagram for describing the rotation angle of the motor M3 of the drive device 900. As described above, the rotation angle of the illumination device 500 is changed by rotation of the motor M3. In FIG. 20, an ellipse before the rotation is the ellipse DA, and an ellipse after the rotation is an ellipse DB. The angle of the major axis of the ellipse DB after the rotation relative to the major axis of the ellipse DA is the angle θ.

Light Distribution Panel

Each light distribution panel 1 included in the light distributor 700 will be described below with reference to FIGS. 21 to 25. Note that a coordinate system different from the XYZ coordinate system in FIGS. 15 to 20 is used in FIG. 21 and the subsequent diagrams.

Figure 21:
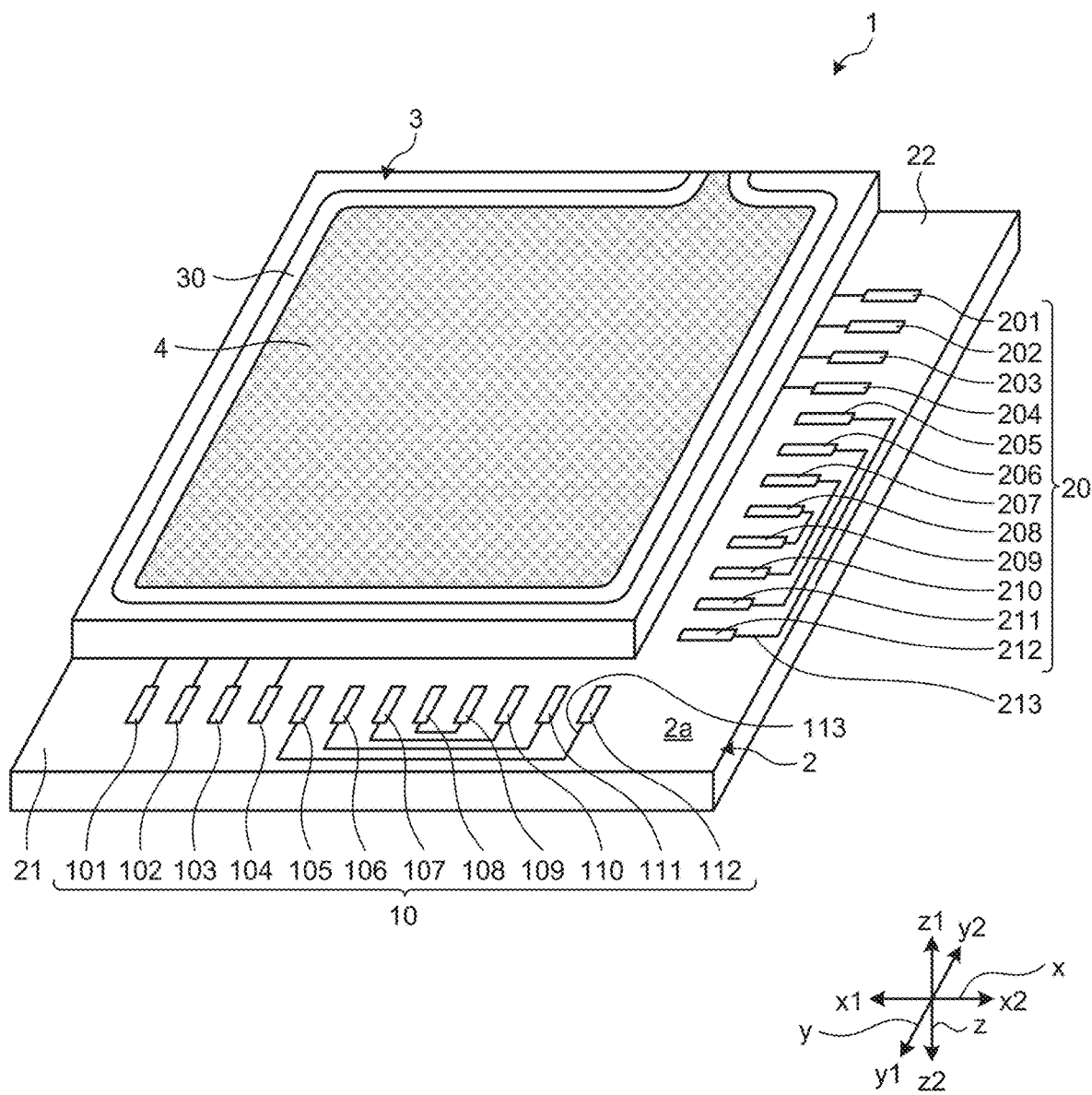
FIG. 21 is a perspective view of a light distribution panel according to the embodiment.
Figure 22:
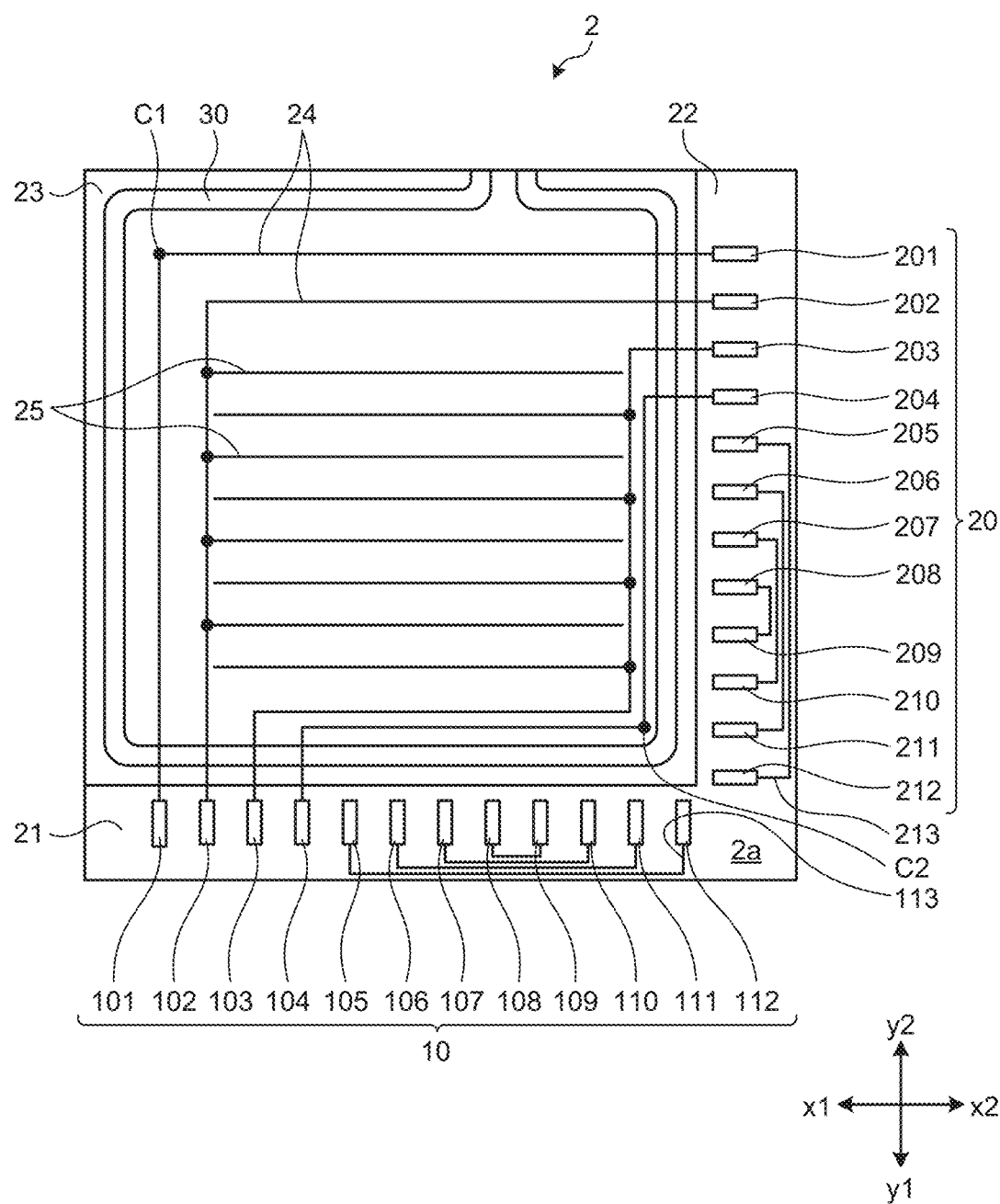
FIG. 22 is a plan view illustrating wiring of an array substrate of the light distribution panel according to the embodiment when viewed from above.
Figure 24:
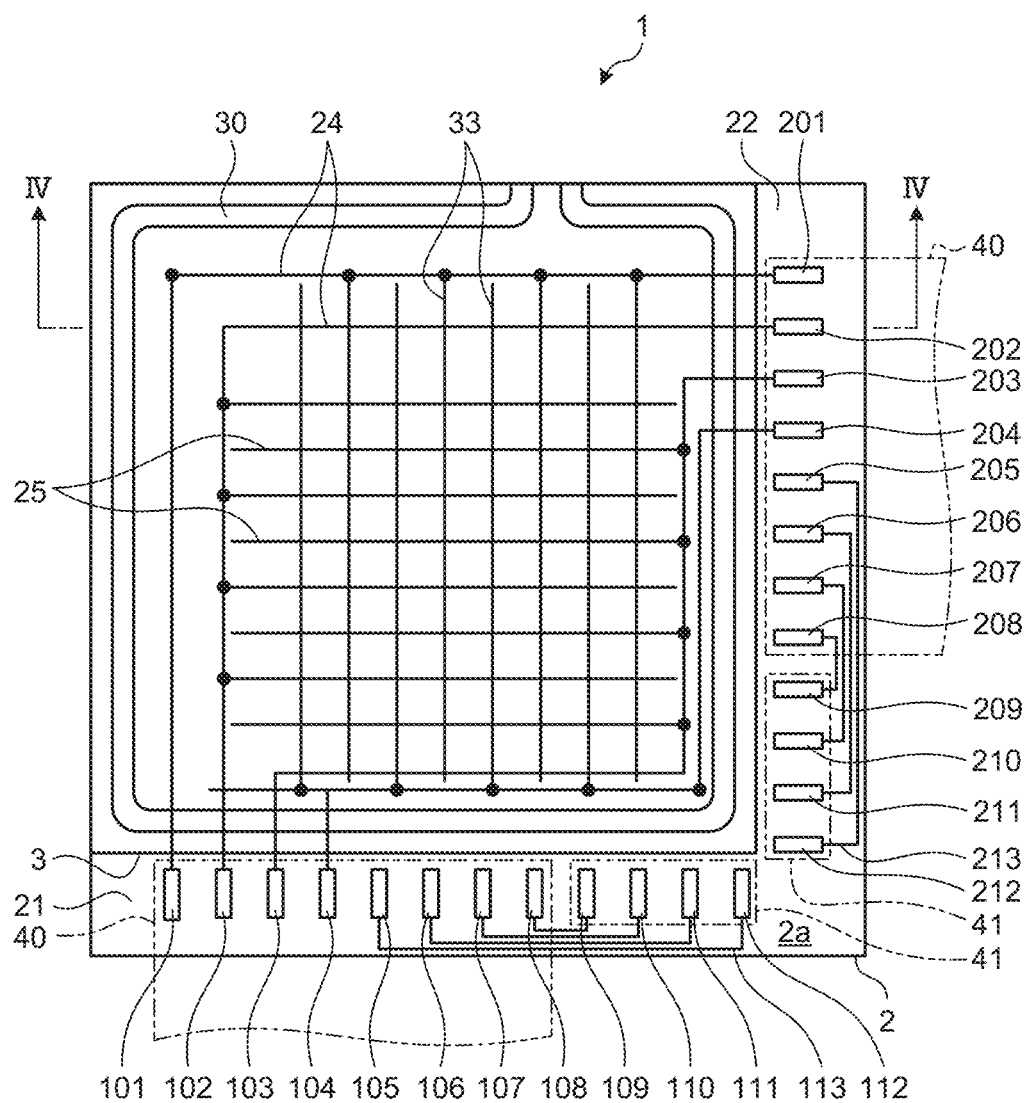
FIG. 24 is a plan view illustrating wiring of the light distribution panel according to the embodiment when viewed from above.
Figure 25:
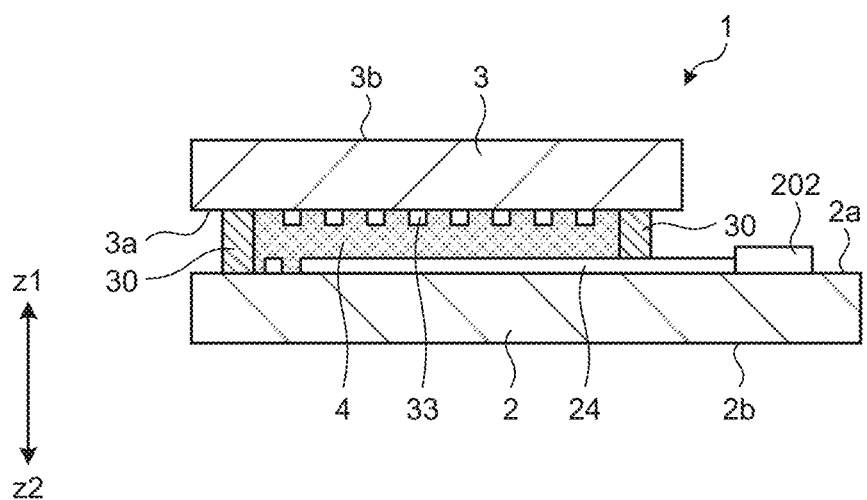
FIG. 25 is a sectional view taken along line IV-IV in FIG. 24.

FIG. 21 is a perspective view of a light distribution panel according to the embodiment. FIG. 22 is a plan view illustrating wiring of an array substrate of the light distribution panel according to the embodiment when viewed from above. FIG. 23 is a plan view illustrating wiring of a counter substrate of the light distribution panel according to the embodiment when viewed from above. FIG. 24 is a plan view illustrating wiring of the light distribution panel according to the embodiment when viewed from above. FIG. 25 is a sectional view taken along line IV-IV in FIG. 24. Note that, in an xyz coordinate system illustrated in FIGS. 21 to 24, a direction along an x1 direction and an x2 direction is referred to as an x direction. The x1 direction is opposite to the x2 direction. A direction along a y1 direction and a y2 direction is referred to as a y direction. The y1 direction is opposite to the y2 direction. A direction along a z1 direction and a z2 direction is referred to as a z direction. The z1 direction is opposite to the z2 direction. The x direction is orthogonal to the y direction. A plane including the x direction and the y direction is orthogonal to the z direction.

As illustrated in FIG. 21, each light distribution panel 1 includes an array substrate 2, a counter substrate 3, a liquid crystal layer 4, and a seal material 30.

As illustrated in FIGS. 21 and 24, the array substrate (first substrate) 2 is larger than the counter substrate (second substrate) 3. In other words, the area of the counter substrate (second substrate) 3 is smaller than the area of the array substrate (first substrate) 2. The array substrate 2 includes a transparent glass 23 (refer to FIG. 22). The counter substrate 3 includes a transparent glass 31 (refer to FIG. 23). In the embodiment, the array substrate 2 and the counter substrate 3 have square shapes in a plan view from above, but the shape of each substrate according to the present disclosure is not limited to a square shape. A first terminal group area 21 and a second terminal group area 22 are provided on a front surface 2a of the array substrate 2. The first terminal group area 21 is positioned at an end part of the front surface 2a of the array substrate 2 on the y1 side. The second terminal group area 22 is positioned at an end part of the front surface 2a of the array substrate 2 on the x2 side. The first terminal group area 21 and the second terminal group area 22 have L shapes when viewed from above. A first terminal group 10 is disposed in the first terminal group area 21, and a second terminal group 20 is disposed in the second terminal group area 22. Note that since the area of the counter substrate 3 is smaller than the area of the array substrate 2, the first terminal group 10 and the second terminal group 20 are exposed. The first terminal group 10 and the second terminal group 20 are also simply referred to as terminal portions.

As illustrated in FIGS. 21 and 24, the first terminal group 10 includes a first terminal 101, a second terminal 102, a third terminal 103, a fourth terminal 104, a first pad 105, a second pad 106, a third pad 107, a fourth pad 108, a fifth pad 109, a sixth pad 110, a seventh pad 111, and an eighth pad 112. The first terminal 101, the second terminal 102, the third terminal 103, the fourth terminal 104, the first pad 105, the second pad 106, the third pad 107, the fourth pad 108, the fifth pad 109, the sixth pad 110, the seventh pad 111, and the eighth pad 112 are sequentially arranged in a right-left direction from the x1 side toward the x2 side. The first pad 105 and the eighth pad 112 are electrically coupled to each other through a lead line 113. The second pad 106 and the seventh pad 111 are electrically coupled to each other through a lead line 113. The third pad 107 and the sixth pad 110 are electrically coupled to each other through a lead line 113. The fourth pad 108 and the fifth pad 109 are electrically coupled to each other through a lead line 113.

As illustrated in FIGS. 21 and 24, the second terminal group 20 includes a fifth terminal 201, a sixth terminal 202, a seventh terminal 203, an eighth terminal 204, a ninth pad 205, a tenth pad 206, an eleventh pad 207, a twelfth pad 208, a thirteenth pad 209, a fourteenth pad 210, a fifteenth pad 211, and a sixteenth pad 212. The fifth terminal 201, the sixth terminal 202, the seventh terminal 203, the eighth terminal 204, the ninth pad 205, the tenth pad 206, the eleventh pad 207, the twelfth pad 208, the thirteenth pad 209, the fourteenth pad 210, the fifteenth pad 211, and the sixteenth pad 212 are sequentially arranged in a front-back direction from the y2 side toward the y1 side. The ninth pad 205 and the sixteenth pad 212 are electrically coupled to each other through a lead line 213. The tenth pad 206 and the fifteenth pad 211 are electrically coupled to each other through a lead line 213. The eleventh pad 207 and the fourteenth pad 210 are electrically coupled to each other through a lead line 213. The twelfth pad 208 and the thirteenth pad 209 are electrically coupled to each other through a lead line 213.

Note that, as illustrated in FIG. 21, the counter substrate 3 is disposed on an upper side (z1 side) relative to the array substrate 2. The seal material 30 and the liquid crystal layer 4 are provided between the counter substrate 3 and the array substrate 2. The seal material 30 is provided in an annular shape along the outer periphery of the counter substrate 3 and the inside of the seal material 30 is filled with the liquid crystal layer 4. Note that a region in which the liquid crystal layer 4 is provided is an active region, the outside of the liquid crystal layer 4 is a frame region, and the first terminal group area 21 and the second terminal group area 22 are terminal regions.

Wiring of the array substrate 2 and the counter substrate 3 will be described below. Note that, as illustrated in FIG. 25, wiring is provided on a front surface among the front and back surfaces of each substrate. In other words, a surface on which wiring is provided is referred to as a front surface, and a surface opposite the front surface is referred to as a back surface. Specifically, as illustrated in FIG. 25, wiring is provided on the front surface 2a of the upper side among the front surface 2a and a back surface 2b of the array substrate 2, and wiring is provided on a front surface 3a of the lower side among a front surface 3a and a back surface 3b of the counter substrate 3. In this manner, the front surface 2a of the array substrate 2 and the front surface 3a of the counter substrate 3 are disposed facing each other with the liquid crystal layer 4 interposed therebetween.

As illustrated in FIG. 22, wires 24 and first electrodes 25 are provided on the front surface 2a of the transparent glass 23 of the array substrate 2. Specifically, the first terminal 101 and the fifth terminal 201 are electrically coupled to each other through a wire 24. The second terminal 102 and the sixth terminal 202 are electrically coupled to each other through a wire 24. The third terminal 103 and the seventh terminal 203 are electrically coupled to each other through a wire 24. The fourth terminal 104 and the eighth terminal 204 are electrically coupled to each other through a wire 24. A plurality of first electrodes 25 are coupled to the wire 24 coupling the second terminal 102 and the sixth terminal 202. A plurality of first electrodes 25 are coupled to the wire 24 coupling the third terminal 103 and the seventh terminal 203. Note that couplers C1 and C2 are provided on the wires 24.

As illustrated in FIG. 23, wires 32 and second electrodes 33 are provided on the front surface 3a of the counter substrate 3. Specifically, the wires 32 are provided on the y1 side and the y2 side, respectively. The wires 32 extend in the x direction. The second electrodes 33 are electrically coupled to the wires 32. The second electrodes 33 extend in the y direction. Note that couplers C3 and C4 are provided on the wires 32. In the example illustrated in FIGS. 22 to 24, the number of first electrodes 25 and the number of second electrodes 33 are eight, but these numbers are schematic and are not necessarily the actual numbers of first electrodes 25 and second electrodes 33. The number of first electrodes 25 and the number of second electrodes 33 only need to be equal to or larger than two and thus may be equal to or larger than nine.

As illustrated in FIGS. 24 and 25, the counter substrate 3 is disposed at an interval on the upper side relative to the array substrate 2. The liquid crystal layer 4 is filled between the array substrate 2 and the counter substrate 3. The coupler C1 of the array substrate 2 and the coupler C3 of the counter substrate 3 are electrically coupled to each other through a conductive pillar (not illustrated). The coupler C2 of the array substrate 2 and the coupler C4 of the counter substrate 3 are electrically coupled to each other through a conductive pillar (not illustrated).

As illustrated in FIG. 24, the first terminal 101, the second terminal 102, the third terminal 103, the fourth terminal 104, the first pad 105, the second pad 106, the third pad 107, and the fourth pad 108 can be electrically coupled to flexible printed circuits (FPC) 40 illustrated with dashed and double-dotted lines. For example, the light distribution panels 1-1 to 1-4 are each coupled to the D/A converter 64 through the individually provided FPC 40.

Figure 26:
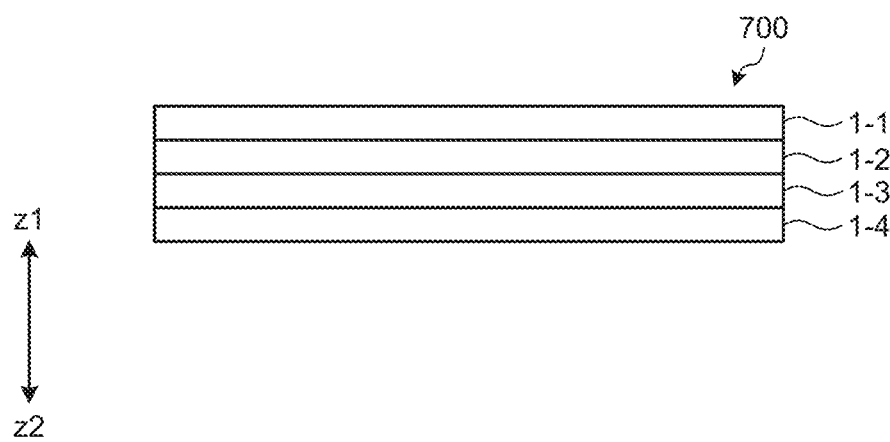
FIG. 26 is a schematic diagram illustrating the configuration of a light distributor.

FIG. 26 is a schematic diagram illustrating the configuration of the light distributor 700. As illustrated in FIG. 26, the light distributor 700 includes, for example, four light distribution panels 1-1 to 1-4 stacked in the z direction. The four light distribution panels 1-1 to 1-4 are the light distribution panels 1-1 to 1-4 described above with reference to FIGS. 21 to 25. The four light distribution panels 1-1 to 1-4 are stacked so that the liquid crystal layers 4 thereof overlap one another and disposition of the first electrodes 25 and the second electrodes 33 included in each light distribution panel overlaps those of the others at a plan viewpoint. A plan viewpoint is the viewpoint of a front view of a plane including the x direction and the y direction. A region in which the first electrodes 25 and the second electrodes 33 are disposed functions as a light distribution control region LDA illustrated in FIG. 27 and the like to be described later.

Figure 27:
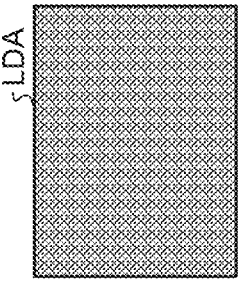
FIG. 27 is a schematic diagram illustrating an example of light distribution control by a light distribution control region.

FIG. 27 is a schematic diagram illustrating an example of light distribution control by the light distribution control region LDA. As described above, the light distribution control region LDA is a region in which the plurality of first electrodes 25 and the plurality of second electrodes 33 are disposed at a plan viewpoint. In other words, the light distribution control region LDA includes a plurality of electrodes extending in the x direction and arranged in the y direction and a plurality of electrodes extending in the y direction and arranged in the x direction. The electrodes extending in the x direction and arranged in the y direction are, for example, the first electrodes 25. The electrodes extending in the y direction and arranged in the x direction are, for example, the second electrodes 33.

Since the light distributor 700 includes the four light distribution panels 1-1 to 1-4 overlapping one another in the z direction, the electrodes extending in the x direction and arranged in the y direction and the electrodes extending in the y direction and arranged in the x direction are quadruplicated in the z direction. The light distribution control region LDA can control the transmission area and transmission degree of light traveling from one surface side of the light distributor 700 toward the other surface side as in Examples E1, E2, E3, and E4 as "exemplary light distribution patterns" illustrated in FIG. 27 by controlling the potential of each of the electrodes extending in the x direction and arranged in the y direction and the electrodes extending in the y direction and arranged in the x direction of the four light distribution panels 1-1 to 1-4 included in the light distributor 700.

Note that, in the following description, equal potential is applied to electrodes overlapping each other at a plan viewpoint. Example E1 in FIG. 27 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction are all 0 volt (V). In Example E1, light from the light source transmits through the light distribution control region LDA with almost no change.

Example E2 is a schematic diagram illustrating the state of the light distribution control region LDA when viewed at a plan viewpoint from a side opposite a light source (for example, a light source 800) in a case where the potentials of the plurality of electrodes extending in the x direction and arranged in the y direction are 0 volt (V), and the potentials of the plurality of electrodes extending in the y direction and arranged in the x direction exceed 0 volt (V). Example E2 illustrates the state of the light distribution control region LDA when controlling light distribution so that, when light spread in the x direction and light spread in the y direction are compared, light from the light source relatively largely spreads in the x direction but does not much spread in the y direction.

Example E3 is a schematic diagram illustrating the state of the light distribution control region LDA when viewed at a plan viewpoint from a side opposite a light source (for example, a light source 800) in a case where the potentials of the plurality of electrodes extending in the x direction and arranged in the y direction exceed 0 volt (V), and the potentials of the plurality of electrodes extending in the y direction and arranged in the x direction are 0 volt (V). Example E3 illustrates the state of the light distribution control region LDA when controlling light distribution so that, when light spread in the x direction and light spread in the y direction are compared, light from the light source relatively largely spreads in the y direction but does not much spread in the x direction.

Example E4 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction all exceed 0 volt (V). Example E4 illustrates the state of the light distribution control region LDA being entirely dark when viewed from the side opposite the light source with the light distribution control region LDA interposed therebetween because light from the light source is significantly interrupted by the light distribution control region LDA.

Note that the light distribution control region LDA only needs to include, at a plan viewpoint, two or more electrodes extending in the x direction and arranged in the y direction and two or more electrodes extending in the y direction and arranged in the x direction. A first condition is such that one light distribution control region LDA includes m electrodes extending in the x direction and arranged in the y direction and n electrodes extending in the y direction and arranged in the x direction. A second condition is such that the number of electrodes (for example, first electrodes 25) extending in the x direction and arranged in the y direction is m×p and the number of electrodes extending in the y direction and arranged in the x direction (for example, second electrodes 33) is n×q in each of the four light distribution panels 1-1 to 1-4. With the first and second conditions as a premise, p light distribution control regions LDA in the x direction and q light distribution control regions LDA in the y direction can be set in a matrix of rows and columns in the light distributor 700. The numbers m, n, p, and q are natural numbers of two or more. Alternatively, the entire active region (region in which the liquid crystal layer 4 is provided) included in one light distribution panel at a plan viewpoint may be one light distribution control region LDA.

Examples E1, E2, E3, and E4 in FIG. 27 particularly illustrate difference in the shape of the light distribution area at a plan viewpoint by potential control. As described above with reference to FIGS. 24 and 25, the shape and size of the light transmission area can be more flexibly controlled because of the relation between potential provided to the first electrodes 25 and potential provided to the second electrodes 33. With this control, the shape and size of emitted light can be changed.

Data Flow in Illumination Device

Figure 28:
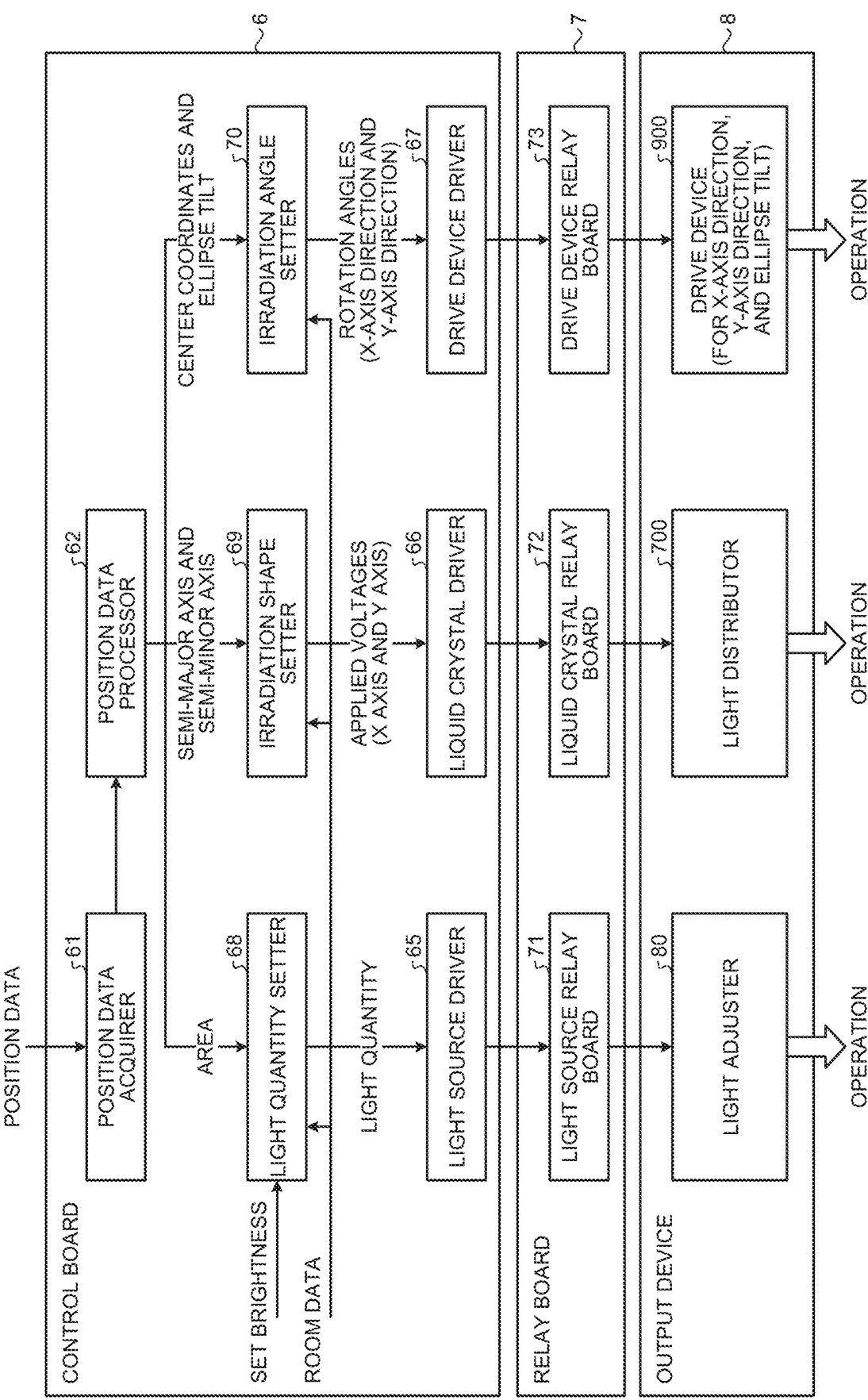
FIG. 28 is a diagram illustrating an example of data flow in the illumination device.

FIG. 28 is a diagram illustrating an example of data flow in the illumination device 500. FIG. 28 illustrates data flow in the control board 6, the relay board 7, and the output device 8 included in the illumination device 500. In FIG. 28, the position data acquirer 61 of the control board 6 acquires position data. The position data processor 62 calculates ellipse data corresponding to the positions of a plurality of persons based on the position data acquired by the position data acquirer 61. The ellipse data calculated by the position data processor 62 is input to the light quantity setter 68, the irradiation shape setter 69, and the irradiation angle setter 70.

The light quantity setter 68 sets the light quantity of the light source based on the ellipse data calculated by the position data processor 62. The light quantity setter 68 sets the light quantity based on the area of an ellipse corresponding to the ellipse data, set brightness, and data related to a room in which the illumination device is installed. The light quantity setter 68 generates light quantity data corresponding to the set light quantity.

The light source driver 65 outputs voltage for light emission from the light source 800 in the light adjuster 80 based on the light quantity data generated by the light quantity setter 68. The light source relay board 71 relays the voltage output from the light source driver 65. The voltage output from the light source driver 65 is input to the light adjuster 80. Light is output as the light source 800 in the light adjuster 80 operates.

The irradiation shape setter 69 sets the irradiation shape of light from the light source based on the ellipse data calculated by the position data processor 62. The irradiation shape setter 69 sets the irradiation shape of light based on the semi-major axis and semi-minor axis of the ellipse corresponding to the ellipse data and the data related to the room in which the illumination device is installed. The irradiation shape setter 69 generates applied voltage data corresponding to the set irradiation shape of light. The applied voltage data generated by the irradiation shape setter 69 is data indicating applied voltage corresponding to each of the X-axis and Y-axis directions of the ellipse.

The liquid crystal driver 66 outputs voltage to be applied to the light distribution panels 1-1 to 1-4 in the light distributor 700 based on the applied voltage data generated by the irradiation shape setter 69. The liquid crystal relay board 72 relays the voltage output from the liquid crystal driver 66. The voltage output from the liquid crystal driver 66 is input to the light distributor 700. Light can be diffused as the light distribution panels 1-1 to 1-4 in the light distributor 700 operate.

The irradiation angle setter 70 sets the irradiation angle of light from the light source based on the ellipse data calculated by the position data processor 62. The irradiation angle setter 70 sets the irradiation angle of light based on the coordinates of the center of the ellipse corresponding to the ellipse data, the tilt of the ellipse, and the data related to the room in which the illumination device is installed. The irradiation angle setter 70 generates rotation angle data corresponding to the set irradiation angle of light.

The drive device driver 67 outputs voltage for rotating each motor in the drive device 900 based on the rotation angle data generated by the irradiation angle setter 70. Specifically, the drive device driver 67 outputs control voltage of a motor for the X-axis direction, control voltage of a motor for the Y-axis direction, and control voltage of a motor for ellipse tilt. The drive device relay board 73 relays the voltages output from the drive device driver 67. The voltages output from the drive device driver 67 are input to the drive device 900. The irradiation direction of light can be changed as the motors of the drive device 900 operate.

Examples of Timings of Data Transfer

Figure 29:
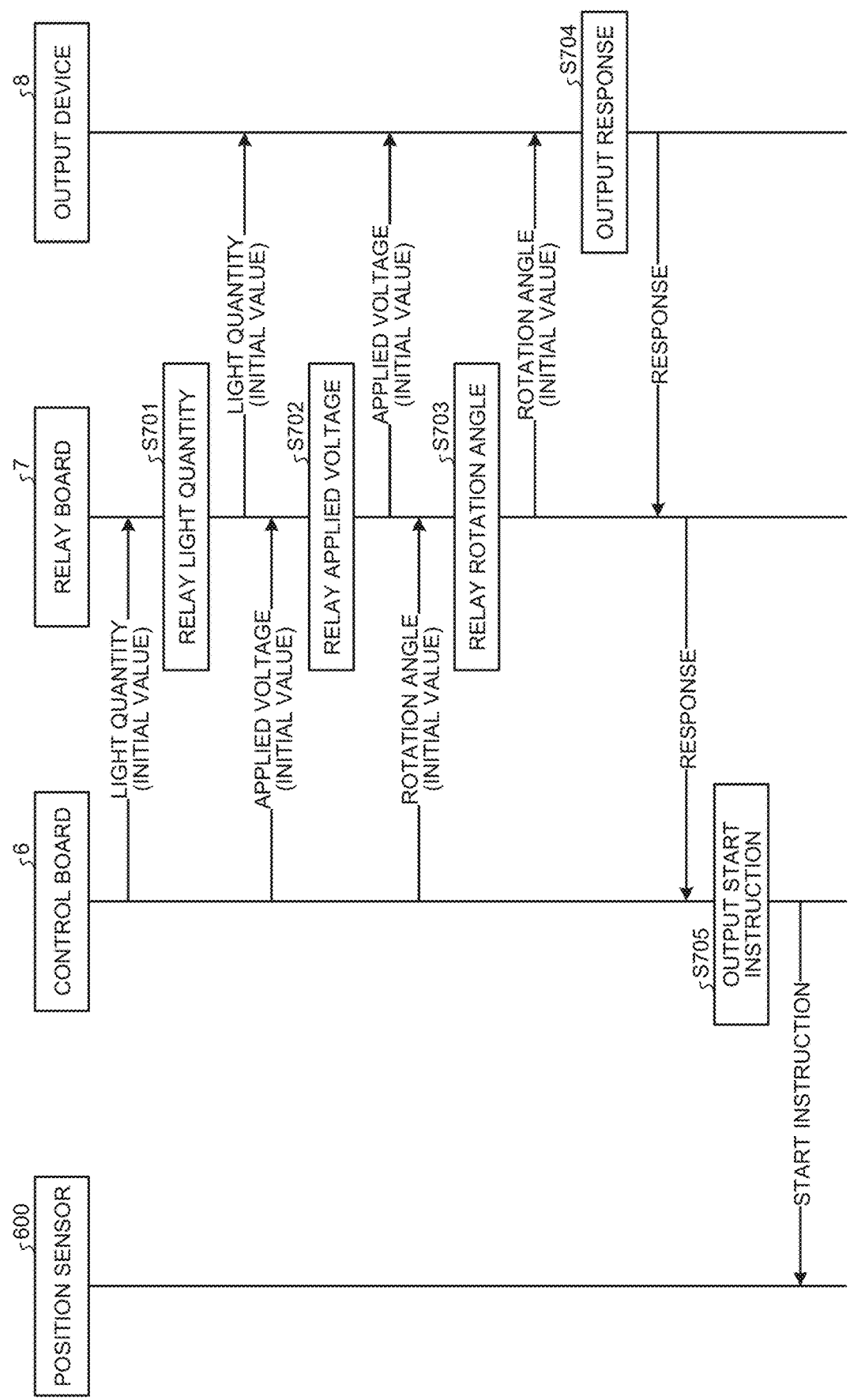
FIG. 29 is a diagram illustrating an example of the timings of data transfer at the start of operation of the illumination device.
Figure 30:
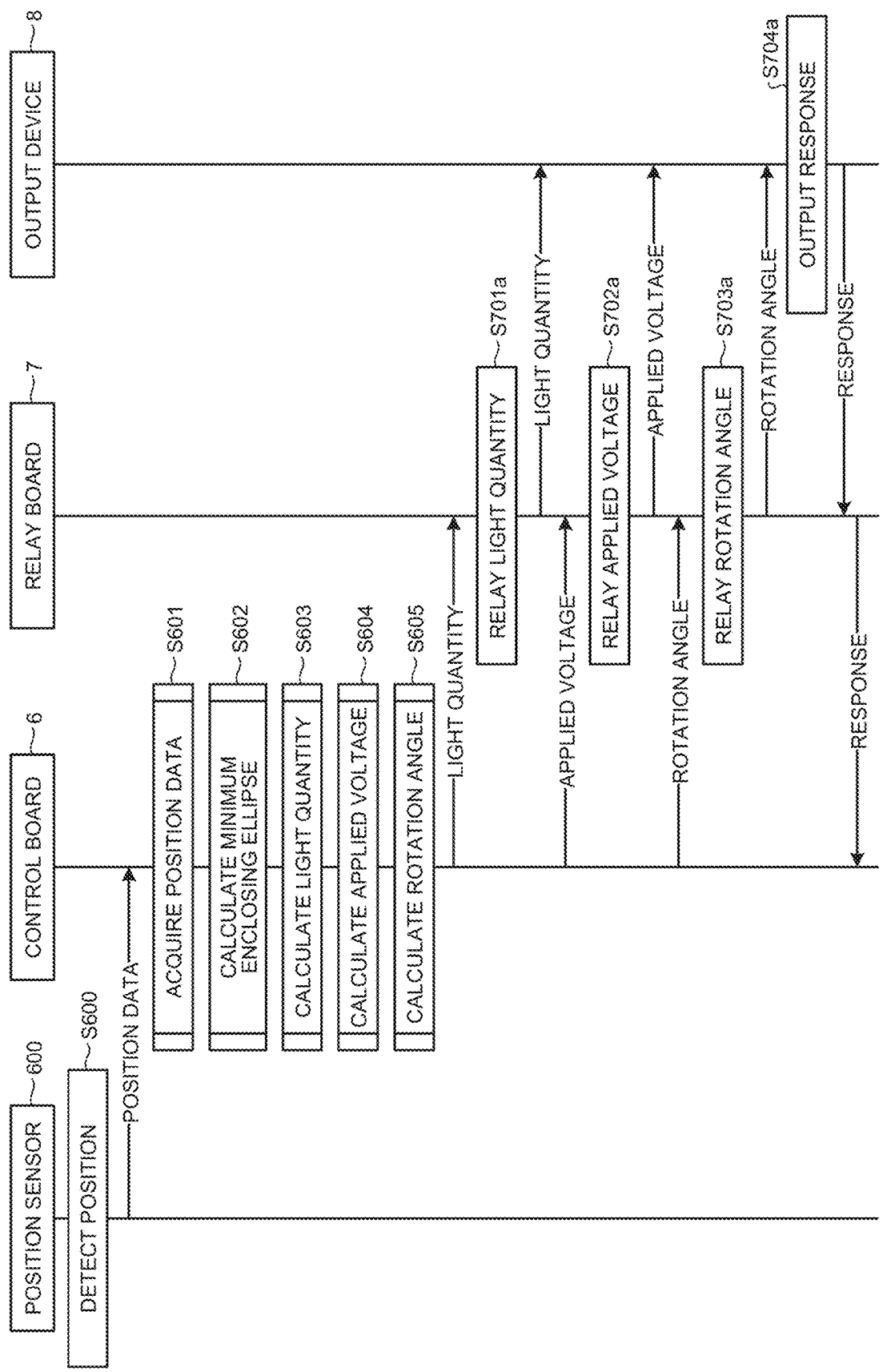
FIG. 30 is a diagram illustrating an example of the timings of data transfer during operation of the illumination device.
Figure 31:
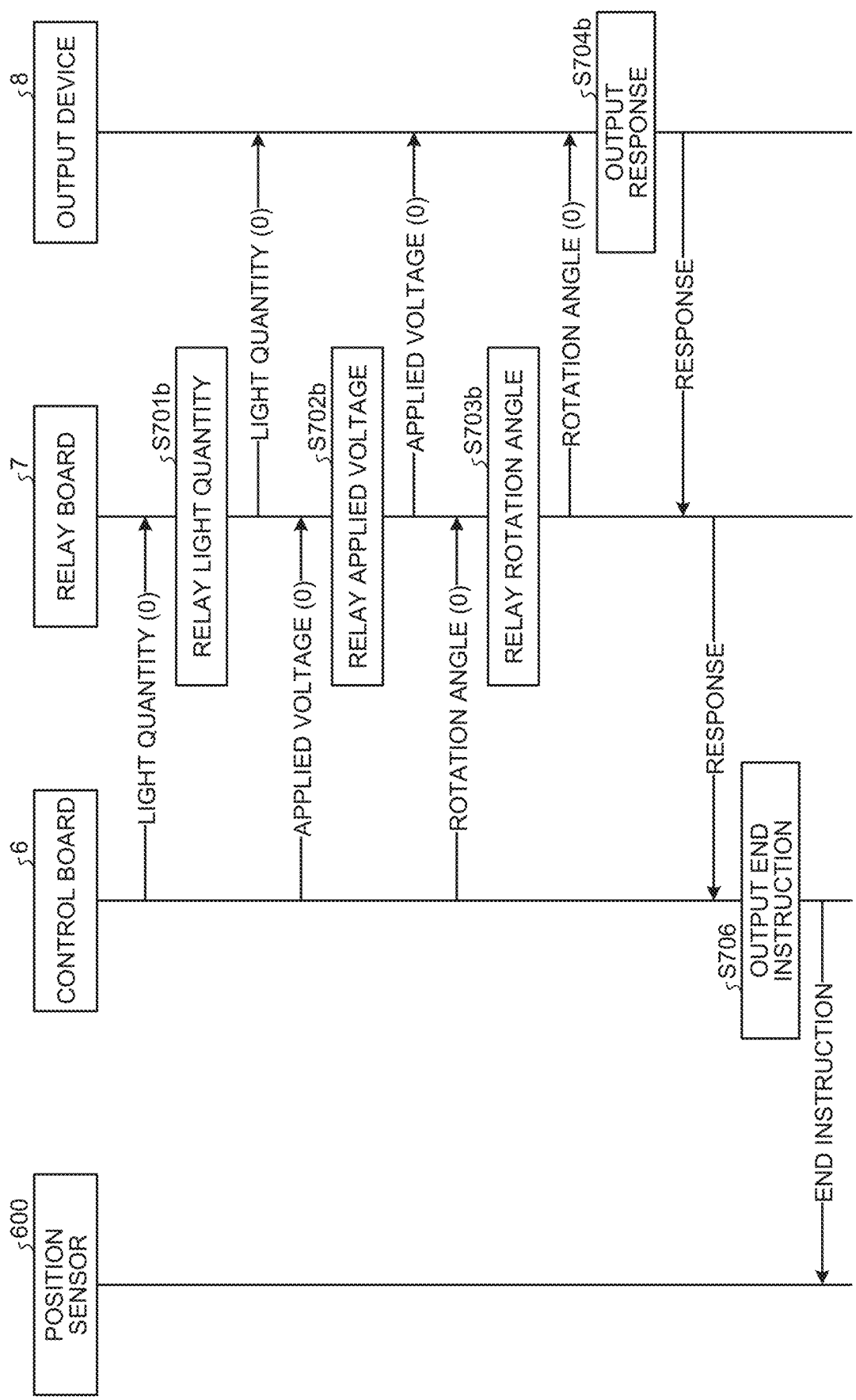
FIG. 31 is a diagram illustrating an example of the timings of data transfer at the end of operation of the illumination device.

FIGS. 29 to 31 are sequence diagrams illustrating examples of the timings of data transfer among components in the illumination device 500.

FIG. 29 illustrates an example of the timings of data transfer at the start of operation of the illumination device 500. When an operation or command to power on the illumination device 500 is input, the control board 6 transfers an initial value of light quantity data to the relay board 7. The relay board 7 relays the initial value of light quantity data (step S701) and transfers the initial value of light quantity data to the output device 8.

Subsequently, the control board 6 transfers an initial value of applied voltage to the relay board 7. The relay board 7 relays an initial value of applied voltage data (step S702) and transfers the initial value of applied voltage data to the output device 8.

In addition, the control board 6 transfers an initial value of rotation angle data to the relay board 7. The relay board 7 relays the initial value of rotation angle data (step S703) and transfers the initial value of rotation angle data to the output device 8.

Thereafter, the output device 8 outputs a response signal (step S704), and the response signal is transferred to the control board 6 through the relay board 7. Then, the control board 6 outputs a start instruction (step S705), and the start instruction is transferred to a position sensor 600. Accordingly, the position sensor 600 starts operation of detecting the positions of persons.

FIG. 30 illustrates an example of the timings of data transfer during operation of the illumination device 500.

In FIG. 30, when the position sensor 600 detects the positions of persons (step S600), position data related to the positions of the persons is transferred from the position sensor 600 to the control board 6. Having acquired the position data (step S601), the control board 6 calculates ellipse data corresponding to the minimum enclosing ellipse based on the position data (step S602). Thereafter, the control board 6 calculates light quantity data based on the ellipse data (step S603). The control board 6 calculates applied voltage data based on the ellipse data (step S604). The control board 6 calculates rotation angle data based on the ellipse data (step S605).

After output from the control board 6, the light quantity data is relayed by the relay board 7 (step S701a) and transferred to the output device 8. The output device 8 sets the light quantity of the light source 800 based on the light quantity data.

After output from the control board 6, the applied voltage data is relayed by the relay board 7 (step S702a) and transferred to the output device 8. The output device 8 sets the diffusion degrees of the light distribution panels 1-1 to 1-4 of the light distributor 700 based on the applied voltage data.

After output from the control board 6, the rotation angle data is relayed by the relay board 7 (step S703a) and transferred to the output device 8. The output device 8 rotates the motors of the drive device 900 based on the rotation angle data.

The output device 8 outputs a response signal (step S704a), and the response signal is transferred to the control board 6 through the relay board 7. Thereafter, the same operation as described above is repeated in a predetermined period during operation of the illumination device 500. Since operation is performed in the predetermined period, it is possible to handle a case where the number of persons in the room changes. As described above with reference to FIGS. 13 and 14, when the number of persons in the room changes, the positions of a plurality of persons, which are indicated by position data change. In this case, the position data processor 62 calculates ellipse data based on the position data after the change, the light quantity setter 68 sets the light quantity of the light source based on the ellipse data according to the position data after the change, the irradiation shape setter 69 sets the irradiation shape of light based on the ellipse data according to the position data after the change, and the irradiation angle setter 70 adjusts the irradiation angle by controlling the drive device 900 so that the center of an ellipse based on the position data after the change coincides with the center of an ellipse based on position data before the change.

FIG. 31 illustrates an example of the timings of data transfer at the end of operation of the illumination device 500. When an operation or command to power off the illumination device 500 is input, the control board 6 transfers light quantity data of "0" to the relay board 7. The relay board 7 relays the light quantity data (step S701b) and transfers the light quantity data to the output device 8.

Subsequently, the control board 6 transfers applied voltage of "0" to the relay board 7. The relay board 7 relays the applied voltage data (step S702b) and transfers the applied voltage data to the output device 8.

In addition, the control board 6 transfers rotation angle data of "0" to the relay board 7. The relay board 7 relays the rotation angle data (step S703b) and transfers the rotation angle data to the output device 8.

Thereafter, the output device 8 outputs a response signal (step S704b), and the response signal is transferred to the control board 6 through the relay board 7. Then, the control board 6 outputs an end instruction (step S706), and the end instruction is transferred to the position sensor 600. Accordingly, the position sensor 600 ends operation to detect the positions of the persons.

Examples of Operation of Illumination Device

Figure 32:
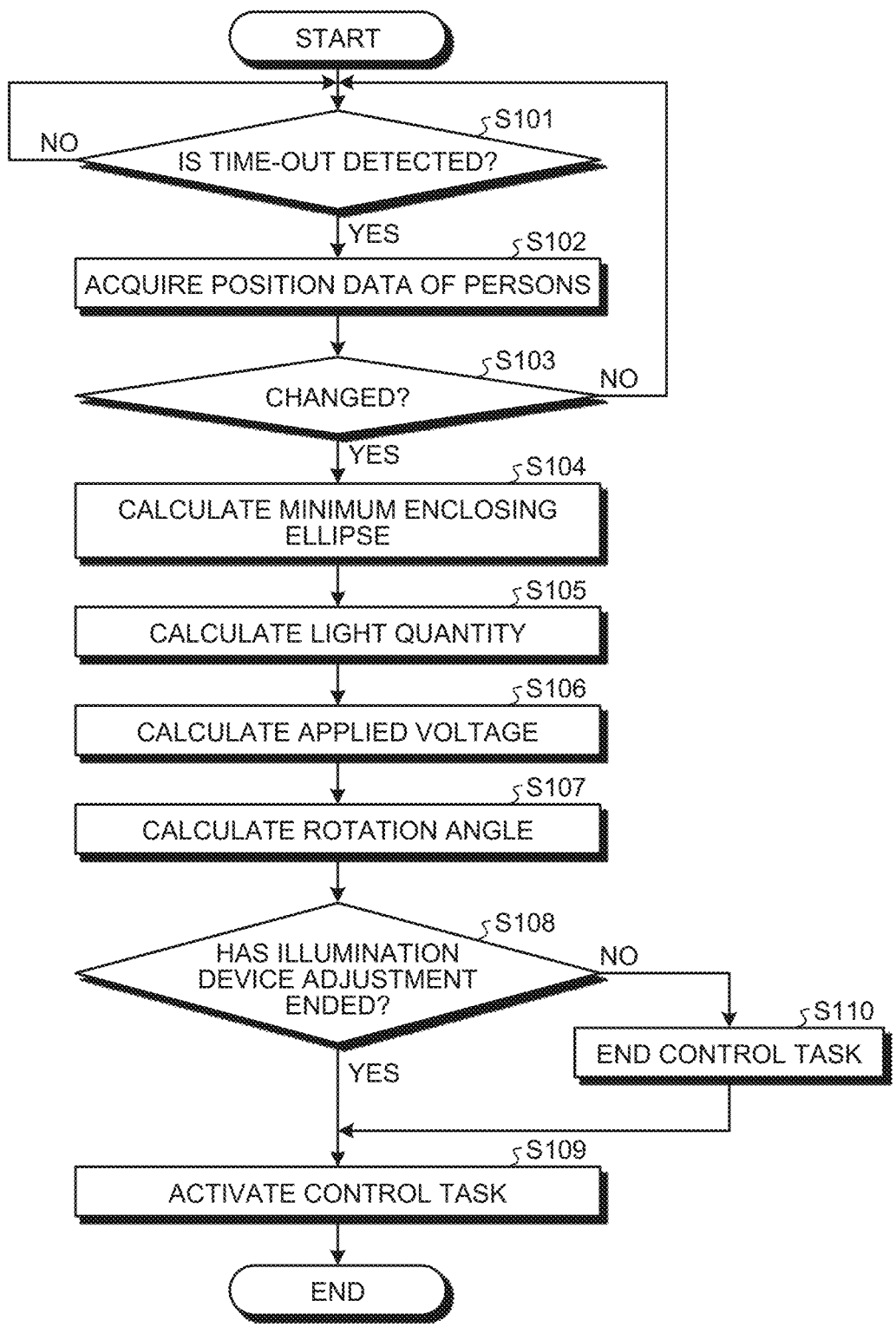
FIG. 32 is a flowchart illustrating an example of a main task of processing by the illumination device.
Figure 33:
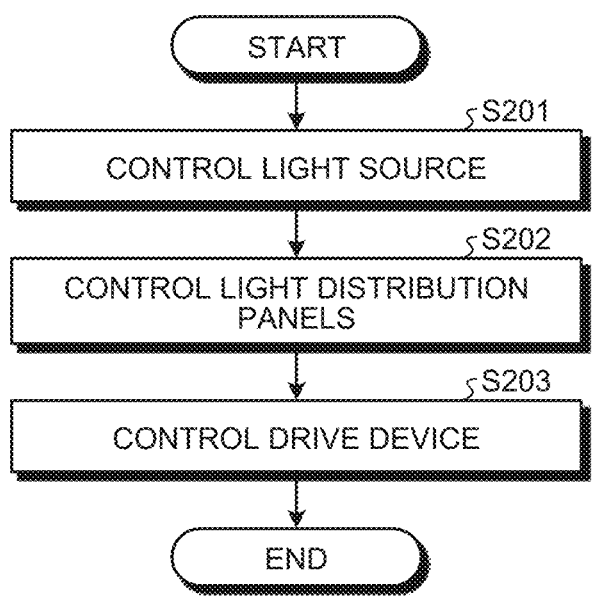
FIG. 33 is a flowchart illustrating an example of a control task of operation of the illumination device.

FIGS. 32 and 33 are flowcharts illustrating examples of operation of the illumination device 500. FIG. 32 is a flowchart illustrating an example of a main task of processing by the illumination device 500.

The processing waits until time-out of a non-illustrated timer is detected (No at step S101). When time-out of the timer is detected, the next processing is executed (Yes at step S101). Subsequent processing is repeated in a predetermined period of the non-illustrated timer.

Subsequently, the illumination device 500 acquires position data of persons (step S102). The illumination device 500 determines whether the acquired position data is changed from the contents of previously acquired position data (step S103).

When it is determined that the contents of the position data have changed at step S103 (Yes at step S103), ellipse data corresponding to the minimum enclosing ellipse is calculated (step S104). Subsequently, light quantity is calculated based on the ellipse data (step S105). In addition, voltage to be applied to the light distribution panels 1-1 to 1-4 is calculated based on the ellipse data (step S106). Moreover, rotation angles are calculated based on the ellipse data (step S107).

After the above-described processing, it is determined whether adjustment of the illumination device has ended (step S108). When it is determined that adjustment of the illumination device has ended at step S108 (Yes at step S108), the next processing of a control task is activated (step S109). Accordingly, the process advances to the control task, which will be described below with reference to FIG. 33.

When it is determined that the contents of the position data have not changed at step S103 (No at step S103), the process returns to step S101 to continue processing. When it is determined that adjustment of the illumination device has not ended at step S108 (No at step S108), the control task is ended (step S110) and then the control task is activated (step S109). Accordingly, the process advances to the control task, which will be described below with reference to FIG. 33. At step S103, it can be regarded that change has occurred in a case where the position data is acquired for the first time. Note that the operation order illustrated in FIG. 32 is exemplary and the operation order of each component of the illumination device 500 may be changed.

FIG. 33 is a flowchart illustrating an example of the control task of operation of the illumination device 500. FIG. 33 illustrates an example of the control order of each component of the illumination device 500. In FIG. 33, first, control of the light source 800 of the light adjuster 80 is performed (step S201). Subsequently, control of the light distribution panels 1-1 to 1-4 of the light distributor 700 is performed (step S202). Lastly, control of the drive device 900 is performed (step S203). Note that the control order illustrated in FIG. 33 is exemplary and the control order of each component of the illumination device 500 may be changed.

Light Quantity Adjustment Upon Change of Irradiation Area

In the case of FIG. 33, control of the light source 800, control of the light distribution panels 1-1 to 1-4, and control of the drive device 900 are performed in the stated order. Change of the irradiation area of light potentially causes discomfort to persons present in the room. Thus, the light quantity is preferably controlled not to cause discomfort. FIGS. 34 to 41 are diagrams illustrating examples of control before and after change of the irradiation area. FIGS. 34 to 41 are diagrams for describing control that does not cause discomfort while the irradiation area of light is changing. In FIGS. 34 to 37, the light quantity is indicated by the interval of hatching. Hatching with a narrow interval represents high (or bright) light quantity, and hatching with a wide interval represents low (or dark) light quantity.

Case where Irradiation Area is Decreased

Figure 34:
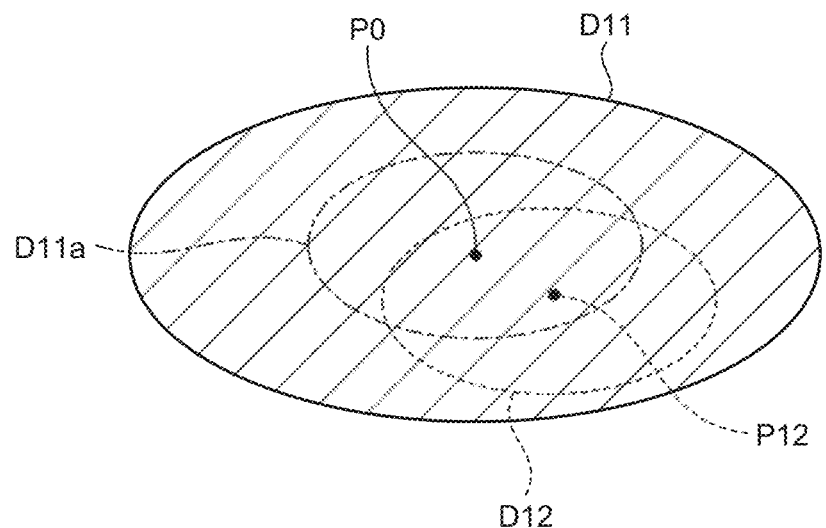
FIG. 34 is a diagram illustrating an example of control before and after change of the irradiation area.
Figure 35:
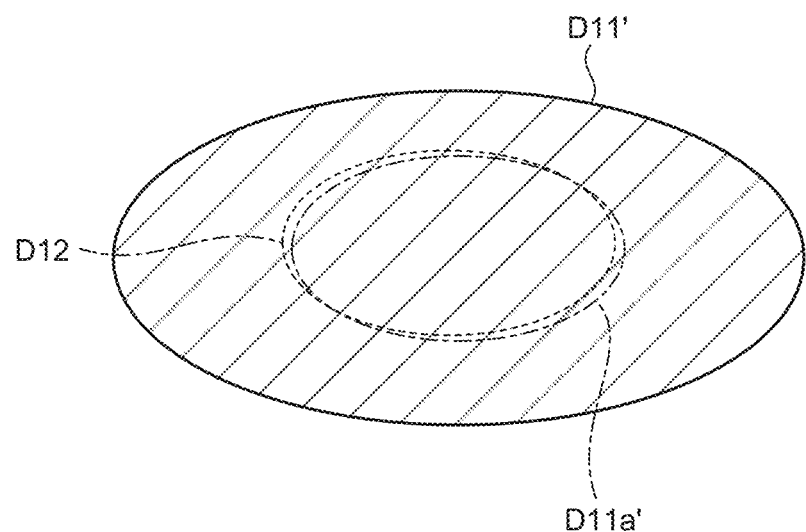
FIG. 35 is a diagram illustrating an example of control before and after change of the irradiation area.

In FIGS. 34 to 37, in a case where the irradiation area of light is changed from an ellipse D11 (illustrated with a solid line) having a larger area to an ellipse D12 (illustrated with a dashed line) having a smaller area, for example, the light quantity is adjusted as described below not to cause discomfort that the room becomes dark while the irradiation area is changing. First, the ellipse D11 is moved by operation of the drive device 900. In the present example, the ellipse is moved from the position of the ellipse D11 illustrated in FIG. 34 to the position of an ellipse D11' illustrated in FIG. 35. The drive device 900 moves the ellipse so that the center P0 of the ellipse D11 and a center P12 of the ellipse D12 after the movement, which are illustrated in FIG. 34, coincide. Note that, in FIG. 34, an ellipse D11a and the ellipse D11 have the same center and are similar to each other in shape. In FIG. 35, an ellipse D11a' and the ellipse D11' have the same center and are similar to each other in shape. In FIG. 35, the ellipse D11a' and the ellipse D12 are the same ellipse but illustrated slightly shifted from each other for convenience of drawing.

Figure 36:
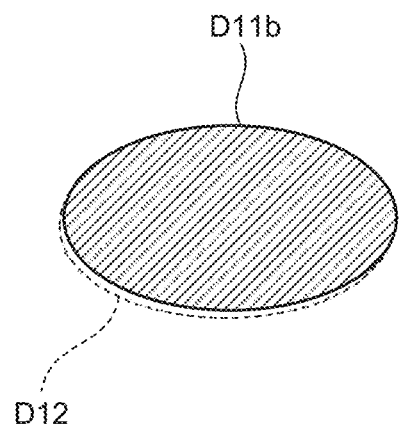
FIG. 36 is a diagram illustrating an example of control before and after change of the irradiation area.
Figure 37:
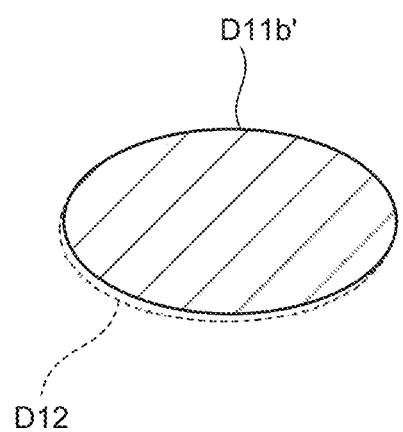
FIG. 37 is a diagram illustrating an example of control before and after change of the irradiation area.
Figure 38:
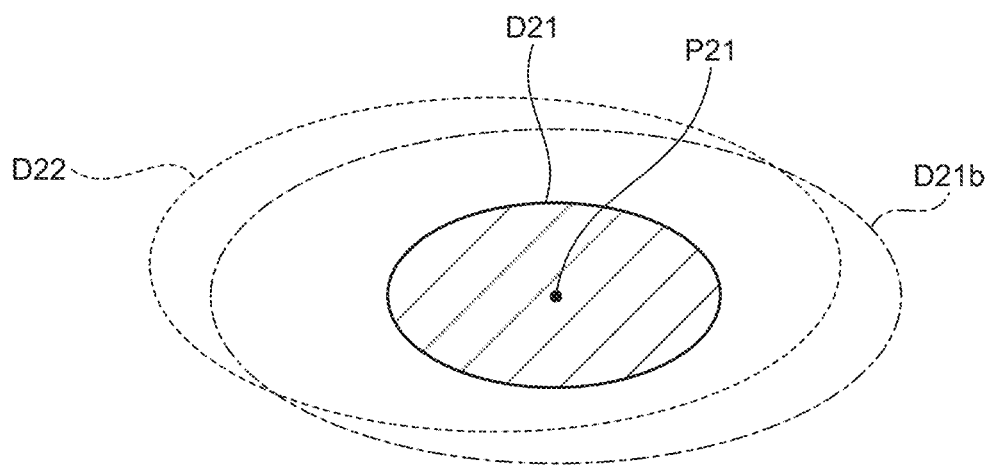
FIG. 38 is a diagram illustrating an example of control before and after change of the irradiation area.

Subsequently, the area of the ellipse D11' illustrated in FIG. 35 is decreased by operation of the light distributor 700 to reach an ellipse D11b illustrated in FIG. 36. In FIG. 36, the ellipse D11b and the ellipse D12 are the same ellipse but illustrated slightly shifted from each other for convenience of drawing. Through the operation of the light distributor 700, the light quantity is not changed but the area is decreased, and accordingly, the ellipse D11b is brighter than the ellipse D11'. Thereafter, the light quantity of the light source 800 is decreased to obtain an ellipse D11b' illustrated in FIG. 37. The ellipse D11b' has brightness equivalent to that of the ellipse D11'. In FIG. 37, the ellipse D11b' and the ellipse D12 are the same ellipse but illustrated slightly shifted from each other for convenience of drawing.

As described above, the drive device 900, the light distributor 700, and the light source 800 are controlled in the stated order. In this case, the light quantity of the light source 800 is decreased after the drive device 900 and the light distributor 700 are controlled in the stated order. The drive device 900 moves the ellipse so that the center P12 of the ellipse D12 illustrated in FIG. 34, which is the irradiation area of light after the change, and the center P0 of the ellipse D11, which is the irradiation area of light before the change coincide. In other words, the centers before and after the change coincide. As a result, the ellipse D11 illustrates in FIG. 34, which is the irradiation area of light before the change, and the ellipse D12, which is the irradiation area of light after the change are similar to each other in shape with the same center P0.

Case where Irradiation Area is Increased

Figure 39:
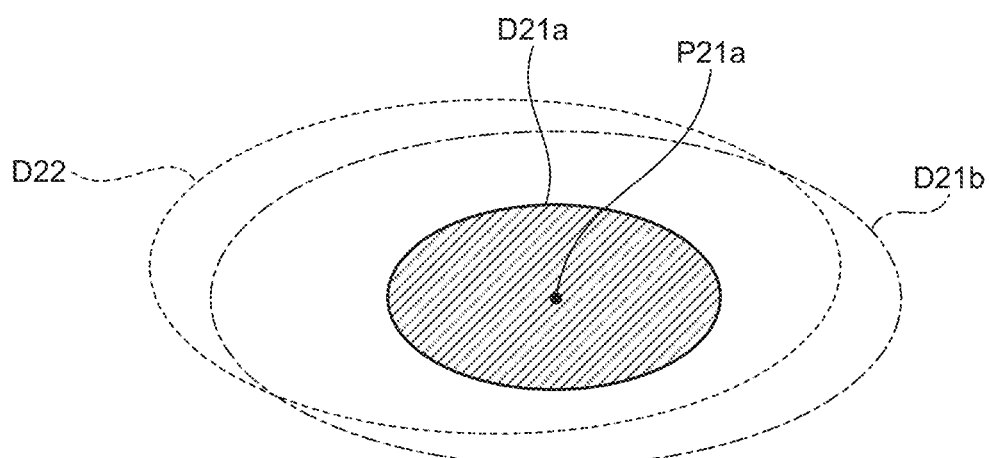
FIG. 39 is a diagram illustrating an example of control before and after change of the irradiation area.

In FIGS. 38 to 41, in a case where the irradiation area of light is changed from an ellipse D21 (illustrated with a solid line) having a smaller area to an ellipse D22 (illustrated with a dashed line) having a larger area, for example, the light quantity is adjusted as described below not to cause discomfort due to brightness change. First, the light quantity of the light source 800 is increased. Accordingly, the ellipse D21 illustrated in FIG. 38 becomes an ellipse D21a illustrated in FIG. 39. The ellipse D21a is brighter than the ellipse D21. Note that, in FIG. 38, the ellipse D21 and an ellipse D21b have the same center and are similar to each other in shape. In FIG. 39, the ellipse D21a and the ellipse D21b have the same center and are similar to each other in shape.

Figure 40:
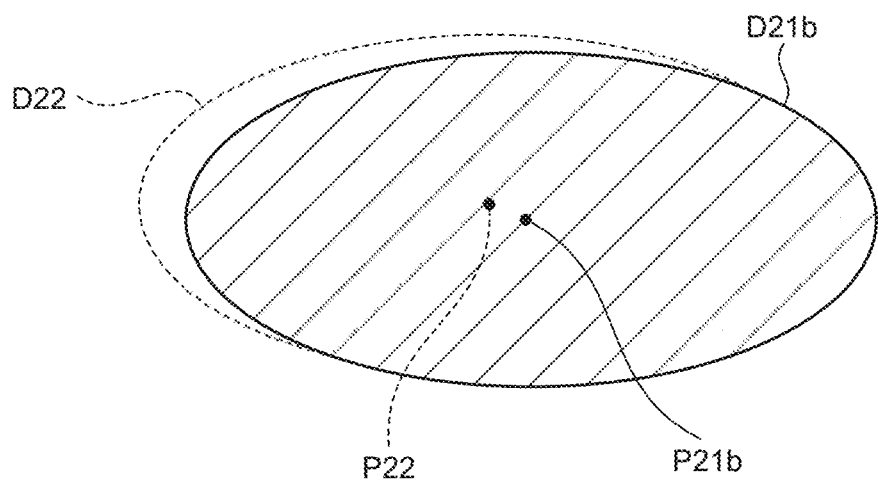
FIG. 40 is a diagram illustrating an example of control before and after change of the irradiation area.
Figure 41:
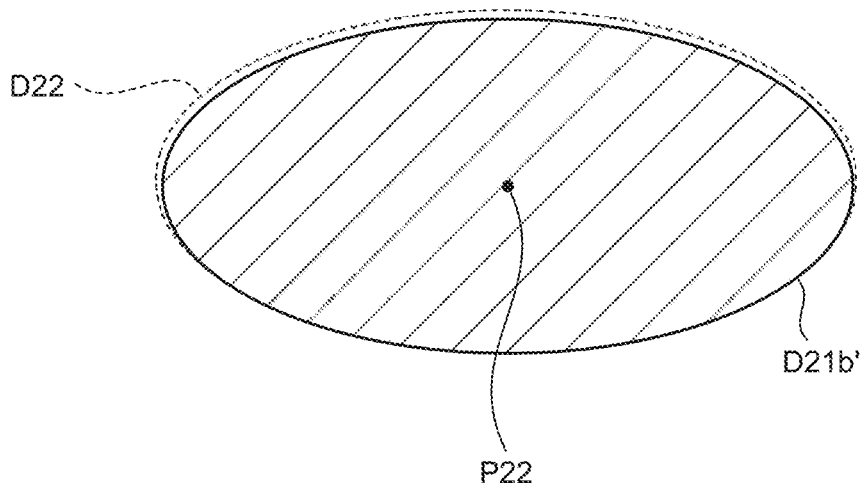
FIG. 41 is a diagram illustrating an example of control before and after change of the irradiation area.

Subsequently, the area of the ellipse D21a illustrated in FIG. 39 is increased by operation of the light distributor 700 to reach the ellipse D21b illustrated in FIG. 40. A center P21a of the ellipse D21a illustrated in FIG. 39 and a center P21b of the ellipse D21b illustrated in FIG. 40 have the same position. Accordingly, the ellipse D21a and the ellipse D21b have the same center and are similar to each other in shape. Through the operation of the light distributor 700, control to change the light quantity is not performed but the area increases, and accordingly, the ellipse D21b is darker than the ellipse D21a. Thereafter, the ellipse is moved from the position of the ellipse D21b illustrated in FIG. 40 to the position of the ellipse D22 illustrated in FIG. 41 by operation of the drive device 900 and becomes an ellipse D21b' illustrated in FIG. 41. In this case, the ellipse is moved so that the center P21b of the ellipse D21b and a center P22 of the ellipse D22 coincide. In FIG. 41, the ellipse D21b' and the ellipse D22 are the same ellipse but illustrated slightly shifted from each other for convenience of drawing.

As described above, the light source 800, the light distributor 700, and the drive device 900 are controlled in the stated order. In this case, the light distributor 700 and the drive device 900 are controlled in the stated order after the light quantity of the light source 800 is increased. The drive device 900 moves the ellipse so that the center P22 of the ellipse D22 illustrated in FIG. 41, which is the irradiation area of light after the change, and the center P21b of the ellipse D21b illustrated in FIG. 40, which is the irradiation area of light before the change coincide. In other words, the centers before and after the change coincide.

With respect to the claims, the present disclosure may take the following forms.

What is claimed is:

1. An illumination device comprising:
   a light source;
   a position data acquirer configured to acquire position data indicating positions of a plurality of detection targets;
   a position data processor configured to calculate ellipse data corresponding to the positions of the detection targets based on the position data;
   a light quantity setter configured to set light quantity of the light source based on the ellipse data calculated by the position data processor;
   an irradiation shape setter configured to set an irradiation shape of light from the light source based on the ellipse data calculated by the position data processor; and
   an irradiation angle setter configured to set an irradiation angle of light from the light source based on the ellipse data calculated by the position data processor.

2. The illumination device according to claim 1, wherein the position data processor calculates ellipse data corresponding to a minimum enclosing ellipse surrounding the positions of the detection targets.

3. The illumination device according to claim 2, wherein the position data processor calculates the ellipse data corresponding to the minimum enclosing ellipse by obtaining an approximate ellipse corresponding to the positions of the detection targets and expanding the approximate ellipse.

4. The illumination device according to claim 1, wherein the light quantity setter sets the light quantity of the light source based on an area of the ellipse according to the ellipse data.

5. The illumination device according to claim 1, further comprising a light distributor configured to change the irradiation shape of light, wherein
   the light distributor changes the irradiation shape of light from the light source based on a signal input from the irradiation shape setter.

6. The illumination device according to claim 5, wherein
   the light distributor includes a light distribution panel for p-wave polarization and a light distribution panel for s-wave polarization,
   the light distribution panel for p-wave polarization and the light distribution panel for s-wave polarization are stacked,
   a signal based on light to be irradiated is provided to the light distribution panel for p-wave polarization and the light distribution panel for s-wave polarization, and
   light emitted from the light source is emitted through the light distribution panel for p-wave polarization and the light distribution panel for s-wave polarization to deform the light from the light source into the shape of the ellipse based on the ellipse data.

7. The illumination device according to claim 6, wherein the irradiation shape setter generates data indicating voltage applied to the light distribution panel for p-wave polarization and the light distribution panel for s-wave polarization based on a semi-major axis and a semi-minor axis of the ellipse according to the ellipse data.

8. The illumination device according to claim 1, further comprising a drive device configured to adjust the irradiation angle of light, wherein
   the irradiation angle setter controls the drive device so that light from the light source is emitted to the position of the center of the ellipse according to the ellipse data.

9. The illumination device according to claim 8, wherein when change has occurred to the positions of the detection targets indicated by the position data acquired by the position data acquirer,
   the position data processor calculates the ellipse data based on the position data after the change,
   the light quantity setter sets the light quantity of the light source based on the ellipse data according to the position data after the change, and
   the irradiation angle setter controls the drive device so that the center of the ellipse based on the position data after the change coincides with the center of the ellipse based on the position data before the change.

10. The illumination device according to claim 1, wherein the position data acquirer acquires position data indicating positions of a plurality of detection targets around a table provided in a room.

* * * * *